(12) United States Patent
Taira et al.

(10) Patent No.: US 8,880,201 B2
(45) Date of Patent: Nov. 4, 2014

(54) SAFETY CONTROLLER AND SAFETY CONTROL METHOD

(75) Inventors: Tetsuya Taira, Nisshin (JP); Hiroshi Bitoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 592 days.

(21) Appl. No.: 13/259,839

(22) PCT Filed: Jan. 31, 2011

(86) PCT No.: PCT/JP2011/000529
§ 371 (c)(1),
(2), (4) Date: Sep. 23, 2011

(87) PCT Pub. No.: WO2012/104901
PCT Pub. Date: Aug. 9, 2012

(65) Prior Publication Data
US 2012/0197416 A1 Aug. 2, 2012

(51) Int. Cl.
*G05B 9/02* (2006.01)
(52) U.S. Cl.
CPC ........................................ *G05B 9/02* (2013.01)
USPC .............................................. 700/21; 700/79
(58) Field of Classification Search
CPC ........... G05B 2219/34382; G05B 2219/34383; G05B 2219/25343; G05B 2219/25352
See application file for complete search history.

(56) References Cited

U.S. PATENT DOCUMENTS

| 4,786,847 | A | 11/1988 | Daggett et al. | |
|---|---|---|---|---|
| 8,457,766 | B2 * | 6/2013 | Taira et al. | 700/21 |
| 8,706,265 | B2 * | 4/2014 | Taira et al. | 700/21 |
| 2009/0210879 | A1 | 8/2009 | Kaiser et al. | |
| 2012/0198464 | A1 * | 8/2012 | Taira et al. | 718/103 |
| 2012/0291036 | A1 * | 11/2012 | Taira et al. | 718/102 |
| 2013/0310976 | A1 * | 11/2013 | Taira et al. | 700/250 |

FOREIGN PATENT DOCUMENTS

| EP | 0268495 A2 | 5/1988 |
|---|---|---|
| JP | 62-293403 A | 12/1987 |
| JP | 2002-086379 A | 3/2002 |
| JP | 2008-172896 A | 7/2008 |
| JP | 2008-191823 A | 8/2008 |
| JP | 2010-271759 A | 12/2010 |

OTHER PUBLICATIONS

International Search Report dated Mar. 1, 2011 of PCT/JP2011/000529.

* cited by examiner

*Primary Examiner* — Ryan Jarrett
(74) *Attorney, Agent, or Firm* — Kenyon & Kenyon LLP

(57) ABSTRACT

To perform control in synchronization with a control cycle of a control target while maintaining safety. A safety controller includes: a processor; a system program for controlling allocation of an execution time of the processor to tasks; a signal generation unit that generates a periodic carrier signal; a control unit that updates a control content for the control target with a control content instructed by instruction information output from the processor, every first predetermined cycle of the carrier signal, and performs PWM control for the control target; and an interrupt signal generation unit that outputs an interrupt signal to the processor every second predetermined cycle of the carried signal. The processor executes the system program to schedule the tasks in accordance with scheduling information on a safety-related time partition and a normal control time partition, switches the time partitions according to an output of the interrupt signal, and outputs the instruction information to the control unit by a normal control task or a safety-related task.

6 Claims, 19 Drawing Sheets

SAFETY CONTROLLER AND SAFETY CONTROL METHOD

This is a 371 national phase application of PCT/JP2011/000529 filed 31 Jan. 2011, the contents of which are incorporated herein by reference.

TECHNICAL FIELD

The present invention relates to a safety controller mounted in a service robot, transportation equipment, and the like to ensure functional safety, and particularly to a safety controller using a computer system.

BACKGROUND ART

Service robots are required to ensure functional safety by constantly monitoring a safety state using an external sensor and a self-diagnosis device and by executing appropriate safety control logic upon detecting some risk.

IEC 61508 has been established as an international standard for functional safety of the service robots described above as well as systems which operate on an electrical principle, such as transportation equipment. In IEC 61508, a system provided to ensure functional safety is called a safety-related system. IEC 61508 defines various techniques for constructing the safety-related system using hardware, such as a microprocessor and a PLC (Programmable Logic Controller), and a computer program (software). The use of techniques defined in IEC 61508 makes it possible to construct the safety-related system using a computer system.

Meanwhile, in recent years, the throughput of programmable electronic devices, such as a microprocessor, has been improved. Accordingly, various application programs are executed in parallel on a computer system by using a multi-task OS (Operating System), thereby enabling integration of computer systems which are mounted in equipment, such as a service robot and a vehicle, for various purposes.

Patent Literature 1, for example, discloses a technique for causing an application program related to ensuring of functional safety (hereinafter, referred to as "safety-related application") to run on a computer system together with another application program (hereinafter, referred to as "non-safety-related application").

When the techniques defined in IEC 61508 are applied to the entire software including the safety-related application and the non-safety-related application, a need arises to apply the techniques also to the non-safety-related application. This causes a problem of an increase in software development cost.

Thus, in the technique disclosed in Patent Literature 1, safety-related applications (a safety monitoring program and a safety control program) are made independent from a non-safety-related application (a normal control program) by time partitioning of a system program. Accordingly, the normal control program can be excluded from the safety-related system, which contributes to a reduction in cost of the safety-related system constructed using a computer system.

CITATION LIST

Patent Literature

[Patent Literature 1] Japanese Unexamined Patent Application Publication No. 2010-271759

SUMMARY OF INVENTION

Technical Problem

Examples of an actuator for controlling a service robot, transportation equipment, and the like include a motor. Referring now to FIG. 21, an exemplary control device for controlling such a motor will be described. The control device shown in FIG. 21 includes a main control ECU (Engine Control Unit) and a motor amplifier (servopack) ECU. The main control ECU and the motor amplifier ECU are connected to each other via a high-speed communication line or an analog transmission line.

The main control ECU operates based on a clock signal. The main control ECU outputs a servo command value for instructing a control content of the motor to the motor amplifier. The motor amplifier ECU generates a PWM (Pulse Width Modulation) signal for controlling the motor, based on the control content indicated by the servo command value output from the main control ECU, and outputs the generated signal to the motor. The motor amplifier ECU reflects the content instructed by the main control ECU in the PWM signal at a timing for each cycle of a carrier signal. Further, the motor amplifier ECU detects an abnormality by monitoring the motor, and controls the motor for ensuring functional safety. Thus, in the control device shown in FIG. 21, the main control ECU for performing normal control, and the motor amplifier ECU for performing control to ensure functional safety are independent from each other. Accordingly, the motor amplifier ECU can perform control for ensuring functional safety without being affected by an abnormality in the main control ECU, thereby ensuring a certain level of safety.

However, the above-mentioned control device has a problem as described below. The main control ECU operates to instruct a control content for the motor at a cycle of about 1 msec based on the clock signal. Meanwhile, the motor amplifier ECU operates to reflect the content instructed by the main control ECU in the PWM signal at a cycle of about 30 μsec based on the carrier signal. This causes a problem that the main control ECU cannot control the motor in synchronization with the control cycle of the motor. That is, the instruction of the control content for the motor is considerably delayed with respect to the control cycle of the motor.

The present invention has been made based on the above findings, and has an object of providing a safety controller and a safety control method which are capable of performing control in synchronization with a control cycle of a control target while maintaining safety.

Solution to Problem

A safety controller according to a first aspect of the present invention includes: a processor that outputs instruction information for instructing a control content for a control target; a system program for controlling allocation of an execution time of the processor to a safety-related task for executing processing related to ensuring of functional safety of the control target, and to a normal control task for executing other processing related to control of the control target; a signal generation unit that generates a carrier signal; a control unit that updates the control content for the control target with a control content instructed by the instruction information output from the processor, every first predetermined cycle of the carrier signal generated by the signal generation unit, and performs PWM (Pulse Width Modulation) control for the control target based on the control content updated; and an interrupt signal generation unit that generates an interrupt signal to the processor and outputs the interrupt signal to the processor every second predetermined cycle of the carrier signal generated by the signal generation unit. The processor executes the system program to schedule the tasks in accordance with scheduling information indicating scheduling contents of a safety-related time partition in which the execution time is allocated to the safety-related task, and of a normal control time partition in which the execution time is allocated to the normal control task. The processor executes the system program to switch the time partitions according to an output of the interrupt signal from the interrupt generation unit. The processor outputs the instruction information to the control unit by executing one of the normal control task and the safety-related task.

A safety control method according to a second aspect of the present invention is a safety control method for updating a control content for a control target with a control content instructed by generated instruction information every first predetermined cycle of a carrier signal, and for performing PWM control for the control target with the control content updated, the safety control method including the steps of: generating an interrupt to a processor every second predetermined cycle of the carrier signal; switching, upon generation of the interrupt, a time partition to one of a safety-related time partition in which an execution time of the processor is allocated to a safety-related task for executing processing related to ensuring of functional safety of the control target, and a normal control time partition in which the execution time is allocated to a normal control task for executing other processing related to control of the control target, in accordance with scheduling information indicating scheduling contents of the safety-related time partition and of the normal control time partition; scheduling the tasks in accordance with the scheduling information, and allocating the execution time to one of the safety-related task and the normal control task in one of the safety-related time partition and the normal control time partition after the switching; and generating the instruction information by executing one of the normal control task and the safety-related task to which the execution time is allocated.

Advantageous Effects of Invention

According to the present invention, it is possible to provide a safety controller and a safety control method which are capable of performing control in synchronization with a control cycle of a control target while maintaining safety.

DESCRIPTION OF EMBODIMENTS

Figure 1:
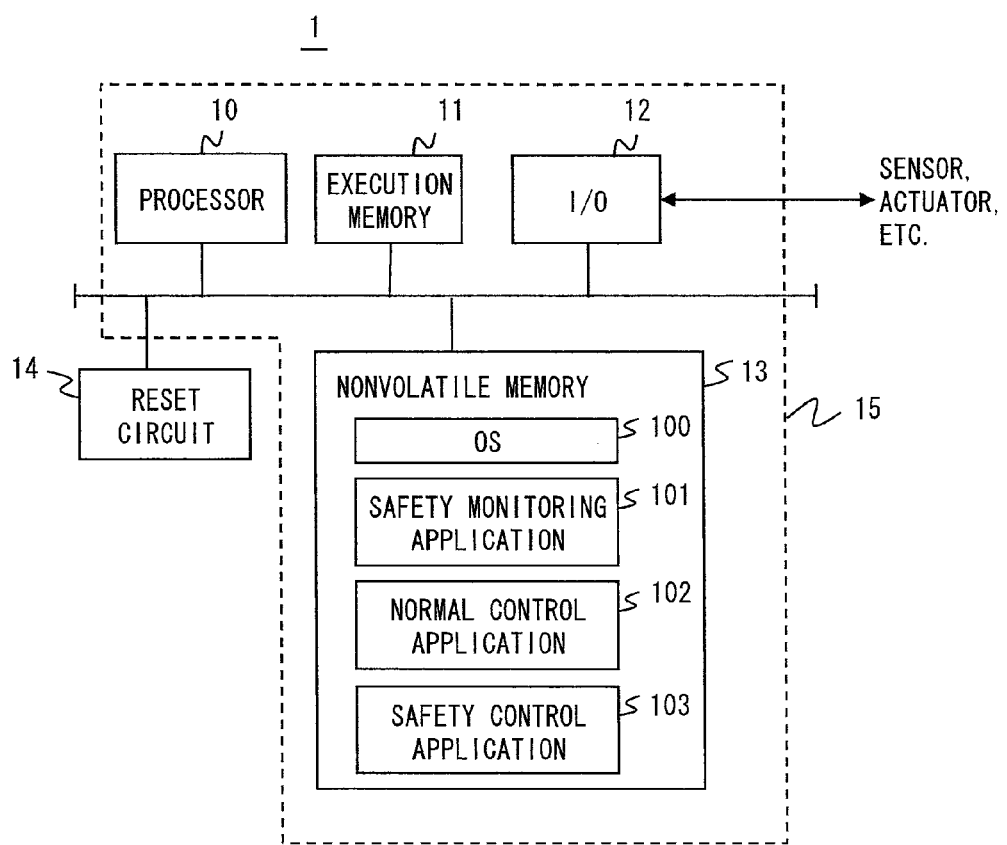
FIG. 1 is a block diagram showing an exemplary configuration of a safety controller according to a first embodiment of the invention.

Exemplary embodiments of the present invention will be described in detail below with reference to the drawings. Throughout the drawings, the same components are denoted by the same reference numerals, and a repeated explanation thereof is omitted as needed for clarity of the explanation.

<First Embodiment of the Invention>

A safety controller 1 according to this embodiment is mounted in a service robot, transportation equipment, or the like and executes safety control for ensuring functional safety. The safety controller 1 is adapted to execute a safety-related application and a non-safety-related application in one computer system. FIG. 1 is a block diagram showing a configuration example of the safety controller 1 according to this embodiment.

A processor 10 fetches programs (instruction stream), decodes instructions, and carries out arithmetic processing according to the result of instruction decoding. Though only one processor 10 is illustrated in FIG. 1, the safety controller 1 may have a multiprocessor configuration including a plurality of processors 10. The processor 10 may be a multicore processor. The processor 10 executes an operating system (OS) 100 as a system program to thereby provide a multiprogramming environment. The multiprogramming environment means an environment in which a plurality of programs are assumed to be executed in parallel by periodically switching a plurality of programs to be executed or by switching programs to be executed upon generation of an event.

Multiprogramming is sometimes called a multiprocess, multithread, multitask, or the like. Each of a process, a thread, and a task indicates a program unit to be executed in parallel in the multiprogramming environment. The multiprogramming environment included in the processor 10 according to this embodiment may be a multiprocess environment or a multithread environment.

An execution memory 11 is a memory used for the processor 10 to execute programs. The execution memory 11 stores programs (an OS 100, applications 101 to 103, etc.), which are loaded from a nonvolatile memory 13, input and output data to and from the processor 10, and the like. Note that the processor 10 may directly execute these programs from the nonvolatile memory 13 without loading the programs from the nonvolatile memory 13 into the execution memory 11.

Specifically, the execution memory 11 may be a randomly accessible volatile memory such as an SRAM (Static Random Access Memory) or a DRAM (Dynamic Random Access Memory). The execution memory 11 of FIG. 1 shows logical units. That is, the execution memory 11 may be implemented as a combination of a plurality of SRAM devices, a combination of a plurality of DRAM devices, or a combination of an SRAM device and a DRAM device, for example.

An I/O port 12 is used for data transmission and reception to and from external devices. When the safety controller 1 is mounted in a service robot, for example, the external devices are a visual sensor capable of measuring obstacles around the service robot, an actuator for causing the service robot to operate, and the like.

The nonvolatile memory 13 is a memory device capable of maintaining storage contents more stably than the execution memory 11 without being supplied with power. The nonvolatile memory 13 is, for example, a ROM (Read Only Memory), a flash memory, a hard disk drive, an optical disk drive, or a combination thereof. The nonvolatile memory 13 stores the OS 100 and the applications 101 to 103. Note that at least a part of the nonvolatile memory 13 may be configured to be removable from the safety controller 1. For example, the memory storing the applications 101 to 103 may be removably mounted. Alternatively, at least a part of the nonvolatile memory 13 may be disposed outside the safety controller 1.

The OS 100 is executed by the processor 10 so as to perform task management including task scheduling, interrupt management, time management, and resource management, and to provide a mechanism for inter-task synchronization and inter-task communication, for example, by using hardware resources such as the processor 10, the execution memory 11, and the nonvolatile memory 13.

In addition, the OS 100 has a function of protecting hardware resources temporally and spatially in order to increase the independence of the safety monitoring application 101 and the safety control application 103, which are related to ensuring of functional safety, from the normal control application 102. Here, the hardware resources include the processor 10, the execution memory 11, and the I/O port 12.

Out of these, temporal protection is performed by partitioning a temporal resource such as an execution time of the processor 10. Specifically, the temporal protection is performed by partitioning the execution time of the processor 10 and allocating a task (a process or a thread) to each partition (referred to as "time partition"). A scheduling function (partition scheduler 21) of the OS 100 provides a guarantee of use of resources, including the execution time of the processor 10, to the task allocated to each time partition (hereinafter, abbreviated as "TP" in some cases).

Figure 2:
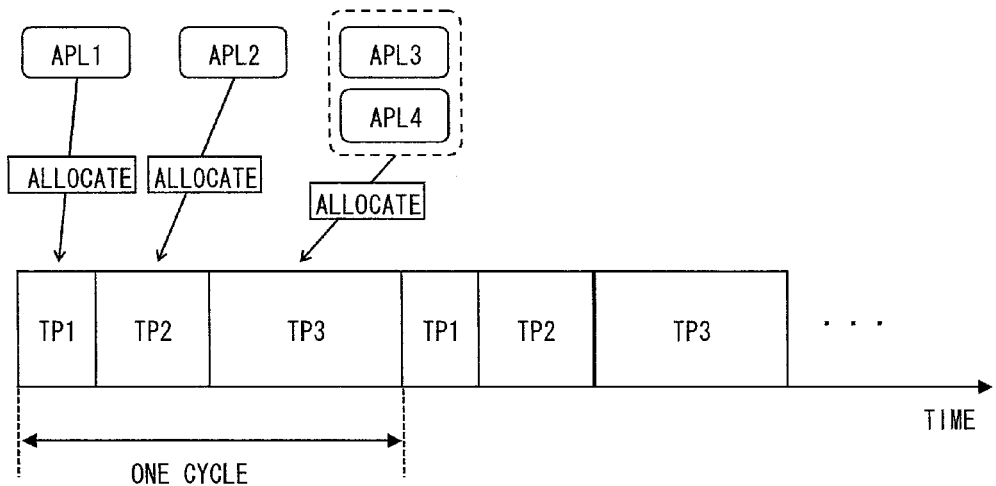
FIG. 2 is a diagram for explaining the concept of time partitioning in the first embodiment of the invention.

FIG. 2 is a conceptual diagram relating to the time partitioning. FIG. 2 shows an example in which a predetermined one-cycle time is divided into three time partitions of TP1, TP2, and TP3. Assuming that the one-cycle time is 100 ticks, the first 20 ticks are defined as TP1, the middle 30 ticks are defined as TP2, and the last 50 ticks are defined as TP3.

In the example shown in FIG. 2, a first application (APL1) to a fourth application (APL4) are allocated to any of TP1 to TP3. The scheduling function (partition scheduler 21) of the OS 100 selects and decides one of TP1 to TP3 to be activated according to a lapse of time. Then, the application allocated to the active TP is executed by the processor 10.

Meanwhile, spatial protection is performed by partitioning stationary resources, including the execution memory 11 and the I/O port 12, and by allocating a task to each partition (referred to as "resource partition"). The scheduling function (partition scheduler 21) of the OS 100 inhibits the task from exceeding the resource partition preliminarily allocated (hereinafter, abbreviated as "RP" in some cases) and from accessing other resources.

Figure 3:
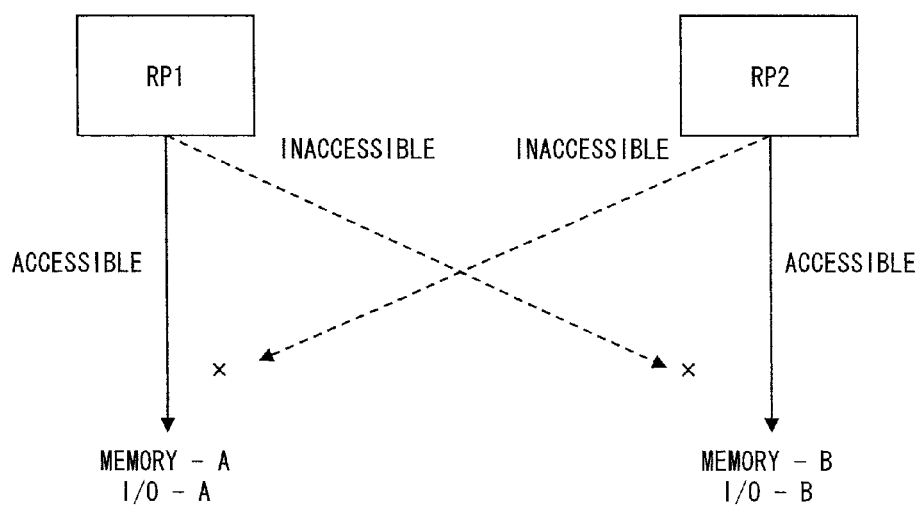
FIG. 3 is a conceptual diagram for explaining the concept of resource partitioning in the first embodiment of the invention.

FIG. 3 is a conceptual diagram relating to the resource partitioning. The example of FIG. 3 shows two RPs (RP1 and RP2). A part (A area) of each of the nonvolatile memory 13 and the execution memory 11 and a part (port A) of the I/O port 12 are allocated to RP1. Further, another part (B area) of each of the execution memory 11 and the nonvolatile memory 13 and another part (port B) of the I/O port 12 are allocated to RP2. Access from RP1 to the resources allocated to RP2 is inhibited, and access from RP2 to the resources allocated to RP1 is inhibited.

Note that there is no need to exclusively allocate all the resources to any one of RPs. That is, the resources may be shared by a plurality of RPs. For example, in the case of performing safety control of a service robot, it is necessary for the actuator to be accessible from both the normal control application 102 and the safety control application 103. Accordingly, the I/O port for controlling the actuator may be shared by the RP to which the normal control application 101 belongs and the RP to which the safety control application 102 belongs.

Returning to FIG. 1, description will be continued. The applications 101 to 103 are executed in the multiprogramming environment provided by the OS 100 and the processor 10. Among these applications, the safety monitoring application 101 includes instruction code for causing the processor 10 to execute monitoring of the running status of the normal control application 102, monitoring of the running status of the safety control application 103, and monitoring of the input and output data to and from the I/O port 12. The safety monitoring application 101 also includes instruction code for causing the processor 10 to execute notification of a result to the partition scheduler 21. That is, the safety monitoring application 101 is a safety-related application.

Further, the normal control application 102 includes instruction code for causing the processor 10 to execute a control procedure to cause a control target, such as a service robot, to execute a normal function/operation. The normal control application 102 also includes instruction code for causing the processor 10 to execute notification of the result to the partition scheduler 21. That is, the normal control application 102 is a non-safety-related application.

Furthermore, the safety control application 103 includes instruction code for causing the processor 10 to execute a control procedure prescribed to ensure functional safety in a case where some abnormality is detected. The safety control application 103 also includes instruction code for causing the processor 10 to execute notification of the result to the partition scheduler 21. That is, the safety control application 103 is a safety-related application.

A reset circuit 14 resets a microcontroller 15 based on a signal from the OS 100. The mechanism for resetting the microcontroller 15 using the reset circuit 14 will be described later.

Figure 4:
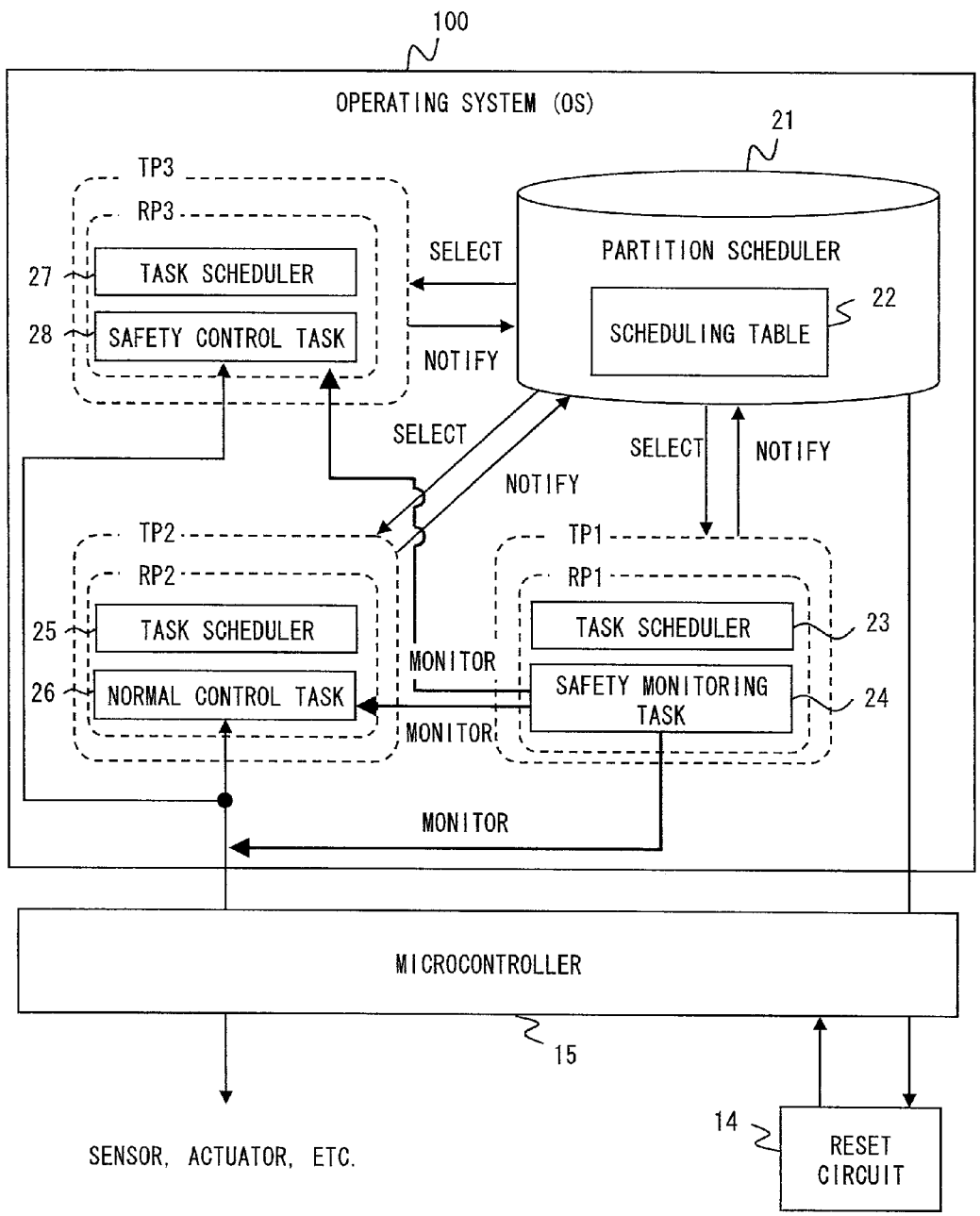
FIG. 4 is a diagram showing relationships between a partition scheduler and tasks which are activated in an execution environment provided by an OS shown in FIG. 1.

Subsequently, relationships between the partition scheduler 21 and tasks generated upon activation of the applications 101 to 103 will be described with reference to FIG. 4. FIG. 4 is a diagram showing the relationships between the partition scheduler 21 and tasks 24, 26, and 28 which are activated in the multiprogramming environment provided by the OS 100.

The microcontroller 15 includes the processor 10, the execution memory 11, the I/O port 12, and the nonvolatile memory 13. While FIG. 4 illustrates a configuration in which the reset circuit 14 is provided outside the microcontroller 15, a configuration in which the reset circuit 14 is included in the microcontroller 15 may also be employed.

The microcontroller 15 is supplied with a clock signal from an external clock source, and the processor 10 and the like operate in a predetermined timer period based on the clock signal. This embodiment is described assuming that the predetermined timer period is one tick. Accordingly, when the OS 100 is executed by the processor 10, the partition scheduler 21 operates every one tick. In the TPs, task schedulers 23, 25, and 27 and the tasks (the safety monitoring task 24, the normal control task 26, and the safety control task 28) operate every one tick.

The partition scheduler 21 operates every one tick and switches the TP (partition scheduling). The partition scheduler 21 selects and decides one of TP1 to TP3 to be activated in the next one tick. Further, the partition scheduler 21 starts operation of the task scheduler on the selected TP.

Specifically, the partition scheduling is performed by the partition scheduler 21 in such a manner that the partition scheduler 21 refers to a scheduling table 22 to perform the partition scheduling in accordance with a scheduling pattern defining a setting of each TP.

The scheduling table 22 retains scheduling patterns each defining a switching order and a timing of each TP. Note that the scheduling table 22 holds at least two different scheduling patterns. One is a scheduling pattern applied when abnormality detection is not performed by the safety monitoring task 24 (i.e., during normal time). The other is a scheduling pattern applied when an abnormality is detected by the safety monitoring task 24. Hereinafter, the scheduling pattern applied during normal time is called a "normal control scheduling pattern", and the scheduling pattern applied upon detection of an abnormality is called a "safety control scheduling pattern".

Figure 5A:
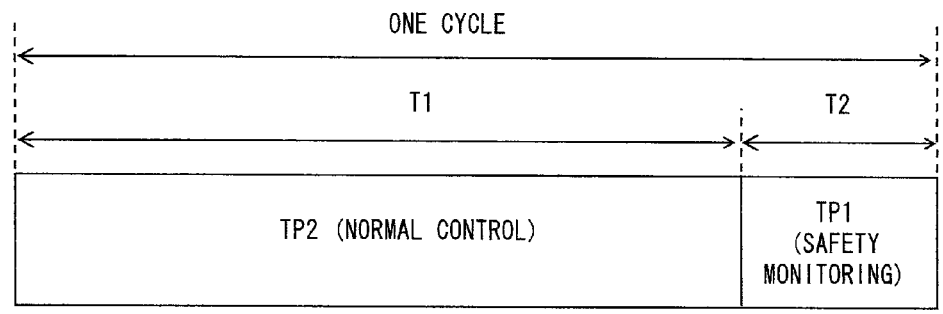
FIG. 5A is a diagram showing a specific example of a scheduling pattern.

FIG. 5A shows a specific example of the normal control scheduling pattern. In FIG. 5A, TP2 to which the normal control task 26 belongs is allocated to the first half (T1) of the one-cycle time. Further, TP1 to which the safety monitoring task 24 belongs is allocated to the latter half (T2) of the one-cycle time. According to the scheduling pattern shown in FIG. 5A, the normal control task 26 and the safety monitoring task 24 are repeatedly scheduled.

Figure 5B:
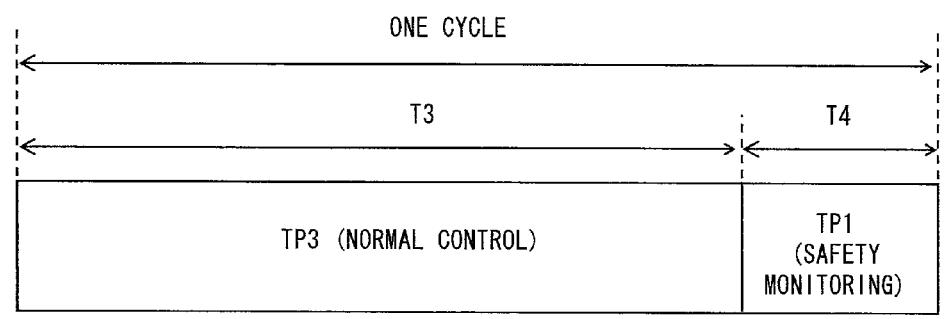
FIG. 5B is a diagram showing a specific example of the scheduling pattern.

FIG. 5B shows a specific example of the safety control scheduling pattern. In FIG. 5B, TP3 to which the safety control task 28 belongs is allocated to the first half (T3) of the one-cycle time. Further, TP1 to which the safety monitoring task 24 belongs is allocated to the latter half (T4) of the one-cycle time. According to the scheduling pattern shown in FIG. 5B, the safety control task 28 and the safety monitoring task 24 are repeatedly scheduled.

Returning to FIG. 4, the description will be continued. The task schedulers 23, 25, and 27 schedule the tasks in the TPs to which the task schedulers respectively belong. Typical scheduling based on priorities may be applied to the scheduling of the tasks in the TPs. Note that FIG. 4 illustrates that each TP includes only one task, but in practice, each TP includes one or more tasks. For example, TP2 for normal control may include two tasks: a normal control task A and a normal control task B.

The safety monitoring task 24 is a task generated upon activation of the safety monitoring application 101. In the example shown in FIG. 4, the safety monitoring task 24 is allocated to TP1 and RP1. The safety monitoring task 24 monitors the running status of the normal control task 26, which is a non-safety-related application, monitors the safety control task 28, which is a safety-related application, and monitors the input and output data to and from the I/O port 12. Furthermore, the safety monitoring task 24 notifies the partition scheduler 21 of the running status of the task.

The normal control task 26 is a task generated upon activation of the normal control application 102. In the example shown in FIG. 4, the normal control task 26 is allocated to TP2 and RP2. The normal control task 26 performs a control procedure for causing a control target, such as a service robot, to execute a normal function/operation. Furthermore, the normal control task 26 notifies the partition scheduler 21 of the running status of the task.

The safety control task 28 is a task generated upon activation of the safety control application 103. In the example shown in FIG. 4, the safety control task 28 is allocated to TP3 and RP3. The safety control task 28 performs a control procedure prescribed to ensure functional safety in a case where some abnormality is detected. Furthermore, the safety control task 28 notifies the partition scheduler 21 of the running status of the task. Note that various techniques may be employed as a specific configuration for notifying the results from each task to the partition 21. For example, a task may invoke a system call (service call) of the OS 100, and results may be notified to the partition scheduler 21 through the OS 100. Alternatively, assuming that a flag related to the running status of a task is stored in the execution memory 11, the task may set the value of the flag according to the running status of the task, and the partition scheduler 21 may judge the running status of the task according to the set value of the flag.

As described above, the partition scheduler 21 operates every one tick to select and decide one of TP1 to TP3 to be activated. Further, the partition scheduler 21 starts operation of the task scheduler on the selected TP. Then, when the task schedulers 23, 25, and 27 start operation, the task scheduling is carried out, and the processor 10 executes the tasks in the TP in the order of the tasks scheduled by the task schedulers 23, 25, and 27. Thus, the application allocated to the active TP is executed by the processor 10.

Figure 6:
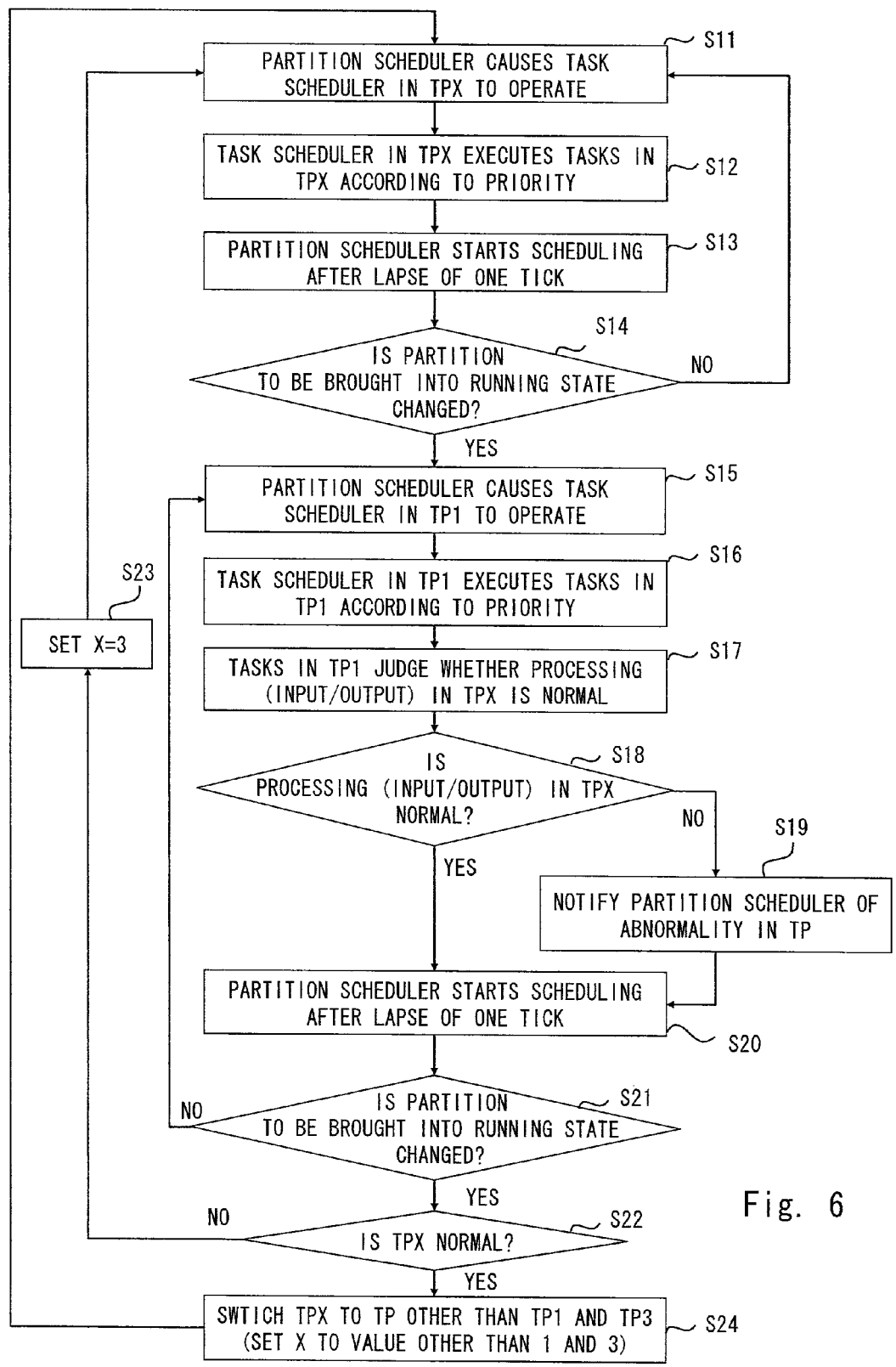
FIG. 6 is a flowchart showing a specific example of a procedure of a partition scheduler.

Subsequently, the partition scheduling performed by the partition scheduler 21 will be described with reference to FIG. 6. FIG. 6 is a flowchart showing a specific example of the procedure of the partition scheduler 21.

First, the partitioning scheduler 21, which operates every one tick, causes the task scheduler in TPX to operate (S11). Here, a variable X represents a TP number, and X is a value other than 1. Specifically, in S11, one of TP2 and TP3, excluding TP1 for safety monitoring, is caused to operate.

Referring to FIG. 6, a case is described by way of example in which the scheduling is executed in accordance with the normal control scheduling pattern (for example, FIG. 5A) or the safety control scheduling pattern (for example, FIG. 5B). In other words, a case is described by way of example in which when TP1 is a TP subsequent to TP2 or TP3 and when an abnormality of TP2 is detected in TP1, TP3 is a TP subsequently selected and decided upon reception of the result from TP1.

The task scheduler in TPX having started operation in S11 executes tasks in TPX according to priority (S12). After a lapse of one tick, the partition scheduler 21 starts scheduling of TPs (S13). Specifically, the partition scheduler 21 selects and decides one of TPs to be activated in the next one tick in accordance with the scheduling pattern.

When the TP to be subsequently activated is not changed (No in S14), the partition scheduler 21 returns to S11 to continue operation on the same TPX. Accordingly, before the timing when TPX is switched, the processing of S11 to S14 is repeated.

When the TP to be subsequently activated is changed (Yes in S14), the partition scheduler 21 causes the task scheduler in the time partition to be changed to operate (S15). Here, the task scheduler in TP1 is caused to operate. Then, the task scheduler 23 in TP1 executes the tasks in TP1 according to priority (S16).

The safety monitoring task 24 executed in TP1 monitors the running status of the normal control task 26 and monitors the input and output data to and from the I/O port 12, to thereby judge whether these are normal (S17). As a result of the judgment, when it is judged that they are abnormal (No in S18), the safety monitoring task 24 notifies the partition scheduler 21 of the result (S19).

After a lapse of one tick, the partition scheduler 21 resumes scheduling (S20). The partition scheduler 21 selects and decides which TP is to be activated in the next one tick in accordance with the scheduling pattern. When the TP to be subsequently activated is not changed (No in S21), the flow returns to S15 to continue the operation on TP1.

When the TP to be subsequently activated is changed (Yes in S21), the partition scheduler 21 further judges whether TPX has been normal according to the result notified from TP1 in S19 (S22). As a result of the judgment, when it has been abnormal (No in S22), the partition scheduler 21 selects and decides TP3 as the TP to be activated in the next one tick (S23).

As a result of the judgment, when it has been normal (Yes in S22), the partition scheduler 21 selects and decides TPX other than TP1 and TP3 as the TP to be activated in the next one tick (S24).

As for the processing shown in FIG. 6, a specific example of the partition scheduling will be described.

First, a case will be described in which scheduling is started in S11 in accordance with the normal control scheduling pattern illustrated in FIG. 5A. In this case, the scheduling is started in S11 assuming that TPX=TP2, and TPX=TP2 is maintained during the processing of S12 to S14. Then, TPX is changed from TP2 to TP1 in S15, and TP1 remains unchanged during the processing of S15 to S21. When it is determined that the running status (data input and output) related to TP2 is normal in S18, TPX=TP2 holds in S24 (that is, the normal control scheduling pattern starting from TP2 is continued). Meanwhile, when it is determined that the running status (data input and output) related to TP2 is abnormal in S18, TPX=TP3 holds in S23 (that is, the scheduling pattern is switched to the safety control scheduling pattern starting from TP3).

Further, a case will be described in which scheduling is started in S11 in accordance with the safety control scheduling pattern illustrated in FIG. 5B. In this case, the scheduling is started assuming that TPX=TP3 in S11, and TPX=TP3 is maintained during the processing of S12 to S14. Then, TPX is changed from TP3 to TP1 in S15, and TP1 remains unchanged during the processing of S15 to S21. When it is determined that the running status (data input and output) related to TP3 is normal in S18, TPX=TP2 holds (that is, the scheduling pattern is switched to the normal control scheduling pattern starting from TP2) in S24. Meanwhile, when it is determined that the running status (data input and output) related to TP3 is abnormal in S18, TPX=TP3 holds (that is, the safety control scheduling pattern starting from TP3 is continued) in S23.

The above example illustrates the case where only the three TPs (TP1 for safety monitoring, TP2 for normal control, and TP3 for safety control) are combined as the scheduling pattern, but a plurality of partitions TP2 for normal control and a plurality of partitions TP3 for safety control may be present. For example, scheduling patterns may be formed by a combination of five TPs (TP1 to TP5) including two TPs of TP2 and TP4 for normal control, TP1 for safety monitoring, and two TPs of TP3 and TP5 for safety control. In this case, in S23, the partition scheduler 21 may determine the type of the abnormality state of the running status (data input and output) related to TPX, and may select one of TP3 and TP5 for safety control according to the abnormality type. Further, in S24, one of TP2 and TP4 for normal control may be selected.

As described above, in this embodiment, the OS 100 includes the partition scheduler 21 for selecting and deciding a partition to be subsequently activated in response to the notification from TP1 for safety monitoring or the notification from each TP. The partition scheduler 21 operates in the predetermined timer period independently from the tasks executed in each TP. The partition scheduler 21 which operates independently in the predetermined timer period includes a partition scheduling function, which provides the following effects.

First, in general, there is a demand for shortening the execution time of the safety monitoring task 24 as much as possible in order to sufficiently ensure the execution time of the normal control task 26. In a related art (for example, Patent Literature 1), the safety monitoring task 24 performs not only monitoring of the running status of the normal control task 26 and monitoring of the input and output data to and from the I/O port 12, but also selection and decision of the scheduling pattern. Therefore, it is necessary to allocate the execution time required for the selection and decision to TP2 to which the safety monitoring task 24 belongs.

In order to guarantee the ensuring of functional safety, it is basically necessary to alternately execute the safety monitoring task 24 and the normal control task 26. For this reason, in the related art, the selection and decision of the scheduling pattern by the safety monitoring task 24 are also executed each time upon execution of the normal control task 26. After a plurality of cycles in total, a lot of execution time is required for the safety monitoring task 24 to select and decide the scheduling pattern.

On the other hand, according to this embodiment, it is not necessary for the safety monitoring task 24 itself to execute selection and decision of the scheduling pattern. Additionally, the execution time required for the partition scheduler 21 to select and decide the scheduling pattern is shortened. This provides an effect that a shorter period of time can be allocated to TP1 for safety monitoring and a longer period of time can be allocated to TP2 for normal control, as compared with the related art.

Furthermore, the processing illustrated in FIG. 6 has been described assuming that the partition scheduler 21 selects and decides TP3 for safety control (S23), or selects and decides TP2 for normal control (S24), according to the result notified from TP1, but the present invention is not limited thereto. For example, a configuration in which the running status is notified to the partition scheduler 21 from each of TP1 to TP3 may be employed in place of the configuration in which the result is notified to the partition scheduler 21 only from TP1 for safety monitoring, and the partition scheduler 21 may select and decide TP3 for safety control according to the result notified from each TP.

When the partition scheduler 21 which operates independently is adapted to receive the notification of results from all TPs, the partition scheduler 21 can grasp the statuses related to all TPs in an integrated manner. Accordingly, when the partition scheduler 21 decides and selects the next partition in response to the notification of the result from TP1 for safety monitoring, for example, the partition scheduler 21 can decide and select the next partition only based on TPs in the normal state in consideration of the status of each TP. This provides an effect that more accurate partition scheduling can be achieved as compared with the related art.

Figure 7:
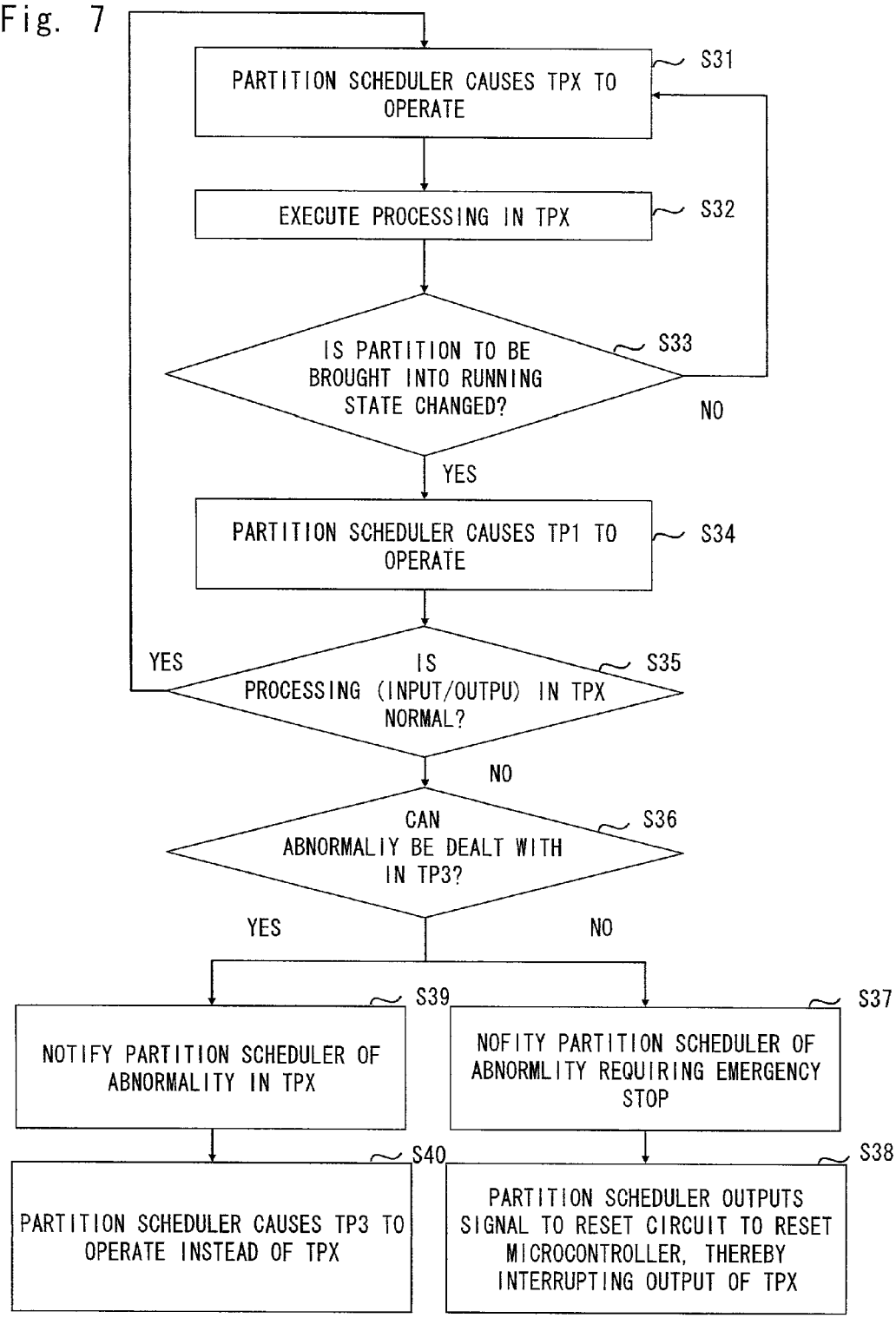
FIG. 7 is a flowchart showing a specific example of a reset procedure for a microcontroller.
Figure 8:
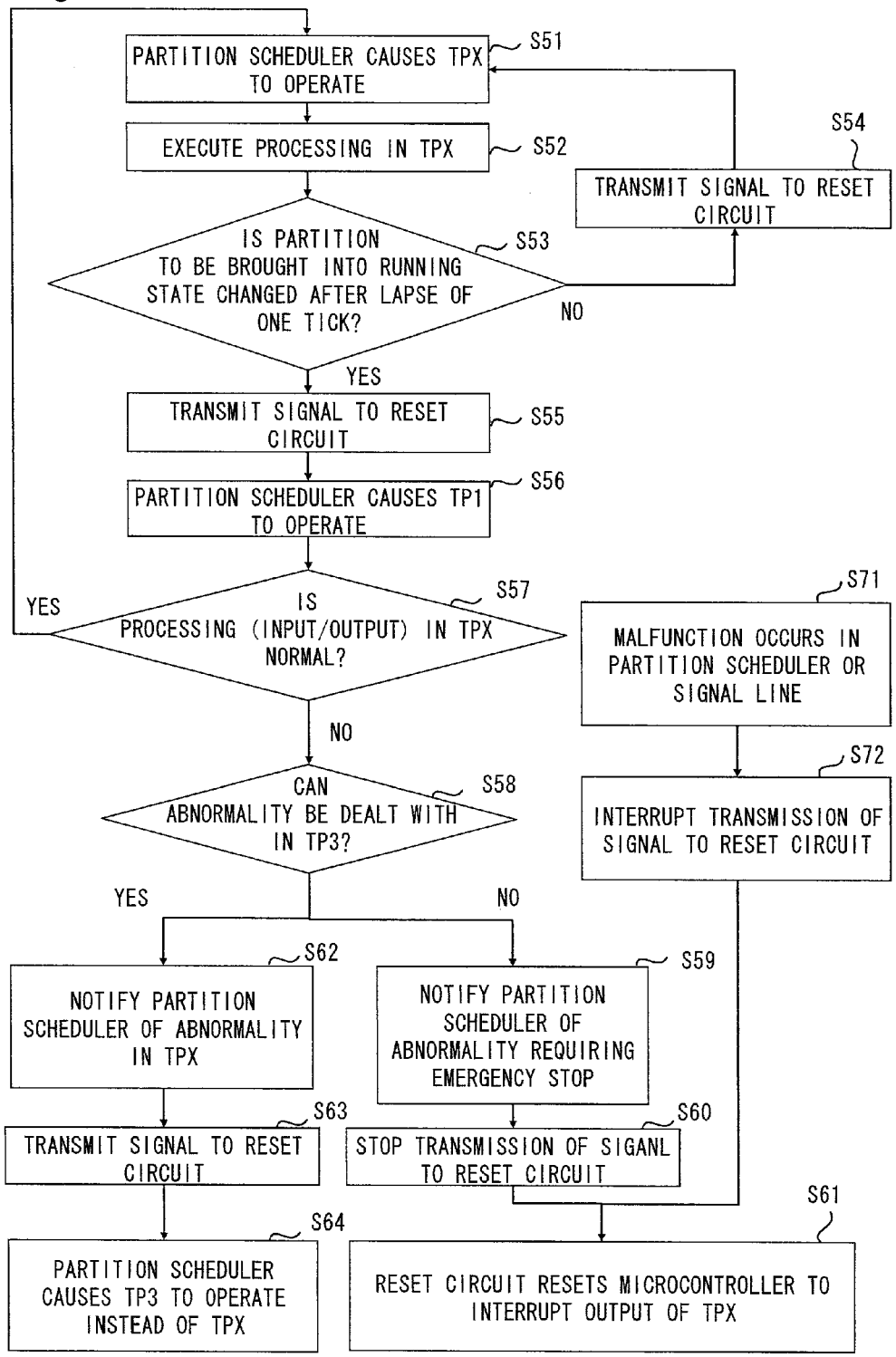
FIG. 8 is a flowchart showing a specific example of a reset procedure of the microcontroller.

Subsequently, the mechanism for resetting the microcontroller 15 using the reset circuit 14 will be described with reference to FIGS. 7 and 8. FIGS. 7 and 8 are flowcharts each showing a specific example of the reset procedure of the microcontroller 15 using the reset circuit 14.

In this embodiment, the partition scheduler 21 which operates every one tick has a function of resetting the microcontroller 15. Upon detecting an abnormality in the OS 100, the partition scheduler 21 takes a measure for the abnormality in conjunction with the reset circuit 14. The reset circuit 14 resets the microcontroller 15 based on the signal from the partition scheduler 21.

Referring first to FIG. 7, a specific example of the reset procedure of the microcontroller 15 using the reset circuit 14 will be described. In the processing shown in FIG. 7, upon receiving a reset instruction signal from the partition scheduler 21, the reset circuit 14 resets the microcontroller 15. Note that in FIG. 7, TPX is a TP other than TP1 and TP3.

First, in S31 to S33, the partition scheduler 21 starts operation of TPX, thereby executing processing related to TPX until the TP to be subsequently activated is changed. After the partition scheduler 21 starts operation of the task scheduler 23 in TP1 (S34), the safety monitoring task 24 belonging to TP1 judges whether the processing (input and output) related to TPX has been normal (S35). As a result of the judgment, when the processing has been normal (Yes in S35), the flow returns to S31 to continue the operation for the same TPX.

As a result of the judgment, when the processing has been abnormal (No in S35), the safety monitoring task 24 belonging to TP1 judges whether the abnormality in TPX is an abnormality that can be dealt with by the safety control task 28 belonging to TP3 (S36). When the abnormality is not an abnormality that can be dealt with in TP3 (No in S36), the safety monitoring task 24 belonging to TP1 notifies the partition scheduler 21 of the abnormality requiring emergency stop (S37). The partition scheduler 21 having received the notification from the safety monitoring task 24 belonging to TP1 outputs a reset instruction signal to the reset circuit 14, and the reset circuit 14 having received the reset instruction signal resets the microcontroller 15 (S38).

When the abnormality is an abnormality that can be dealt with in TP3 (Yes in S36), the safety monitoring task 24 belonging to TP1 notifies the partition scheduler 21 of the abnormality in TPX (S39). The partition scheduler 21 having received the notification from TP1 switches the time partition from TPX to TP3 (S40).

Referring next to FIG. 8, another specific example of the reset procedure of the microcontroller 15 using the reset circuit 14 will be described. In the processing shown in FIG. 8, the partition scheduler 21 periodically transmits signals to the reset circuit 14. Further, when the transmission of signals from the partition scheduler 21 is interrupted, the reset circuit 14 resets the microcontroller 15. Note that in FIG. 8, TPX is a TP other than TP1 and TP3.

In comparison with the processing of S31 to S35 shown in FIG. 7, it is clarified in S53 of FIG. 8 that the partition scheduler 21 operates every one tick, and there is a difference in that the partition scheduler 21 periodically transmits signals to the reset circuit 14 in S54 and S55. The other processing of S51 to S57 shown in FIG. 8 is basically the same as that of S31 to S35 shown in FIG. 7.

Further, in comparison with the processing of S36 to S40 shown in FIG. 7, there is a difference in that the partition scheduler 21 stops transmission of signals to the reset circuit 14 in S60 of FIG. 8, and that the partition scheduler 21 transmits signals to the reset circuit 14 in S63. There is another difference in that, in S61 of FIG. 8, the reset circuit 14 resets the microcontroller 15 upon interruption of the transmission of signals from the partition scheduler 21. The other processing of S58 to S64 shown in FIG. 8 is basically the same as that from S36 to S40 shown in FIG. 7.

Moreover, as shown in S71 and S72 of FIG. 8, when a malfunction occurs in the partition scheduler 21, or when a malfunction occurs in a signal line from the partition scheduler 21 to the reset circuit 14, in parallel with the processing of S51 to S64, the transmission of signals from the partition scheduler 21 to the reset circuit 14 is interrupted. Also in this case, the reset circuit 14 resets the microcontroller 15 upon interruption of the transmission of signals from the partition scheduler 21 (S61).

According to the processing shown in FIG. 8, the microcontroller 15 can be reliably reset not only when the reset instruction is intentionally issued from the partition scheduler 21 to the reset circuit 14, but also when the partition scheduler 21 itself fails to operate normally due to some causes or when a malfunction occurs in a signal line for transmitting signals from the partition scheduler 21 to the reset circuit 14. At the same time, execution of normal switching of TPs every one tick can also be guaranteed.

Note that in FIGS. 7 and 8, the description has been made assuming that the partition scheduler 21 outputs the reset instruction signal to the reset circuit 14 or stops transmission of the signal to the reset circuit 14 in response to the notification of the result from TP1. Alternatively, the partition scheduler 21 may output the reset instruction signal to the reset circuit 14 or stop transmission of the signal to the reset circuit 14 in response to the notification of the result from any one of TP1 to TP3.

[Second Embodiment of the Invention]

Figure 9:
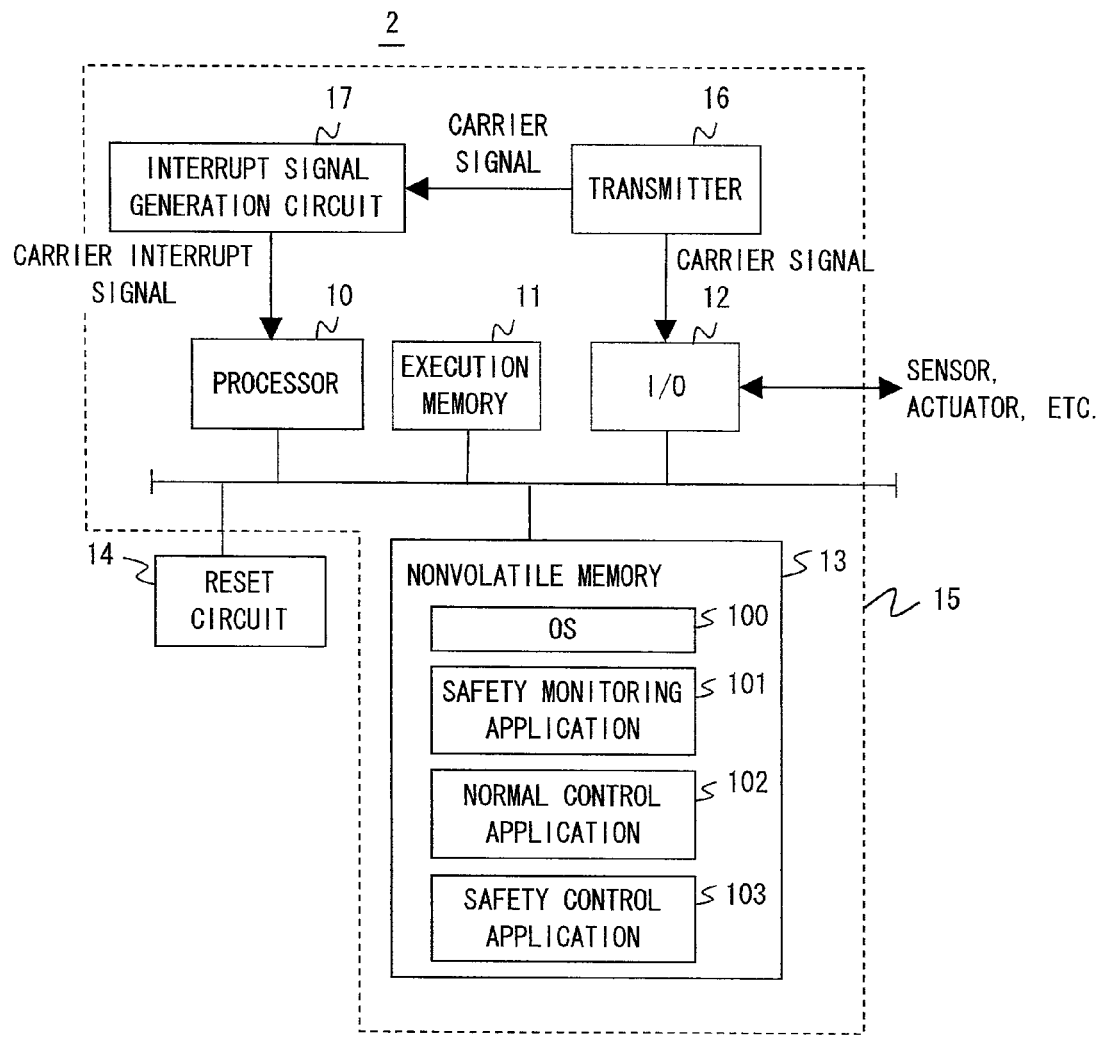
FIG. 9 is a block diagram showing an exemplary configuration of a safety controller 2 according to a second embodiment of present invention.

Referring next to FIG. 9, a configuration of a safety controller 2 according to a second embodiment of the invention will be described. FIG. 9 is a block diagram showing an exemplary configuration of the safety controller 2 according to the second embodiment. Hereinafter, description of the same contents as those of the safety controller 1 according to the first embodiment is omitted.

A transmitter 16 generates a carrier signal. The transmitter 16 outputs the generated carrier signal to each of the I/O port 12 and an interrupt signal generation circuit 17.

The interrupt signal generation circuit 17 generates an interrupt signal based on the cycle of the carrier signal output from the transmitter 16 and outputs the generated interrupt signal to the processor 10. Upon detecting a valley portion or a peak portion of the carrier signal, the interrupt signal generation circuit 17 generates an interrupt signal and outputs the generated interrupt signal to the processor 10. That is, upon detecting a vertex of a triangular wave of the carrier signal, the interrupt signal generation circuit 17 generates the interrupt signal and outputs it to the processor 10. As a result, a carrier interrupt to the processor 10 is generated at each cycle of the carrier signal.

The processor 10 causes the partition scheduler 21 to operate when the interrupt signal is output from the interrupt signal generation circuit 17. The processor 10 outputs a command value for instructing a control content for a control target to the I/O port 12.

The I/O port 12 generates a PWM signal and outputs it to an actuator. Thus, the control target including an external device is controlled. In the second embodiment, a case is described in which an actuator is employed as a motor controlled by the PWM signal. The I/O port 12 updates the value of the PWM signal, which is output to the external device, with the control content indicated by the command value output from the processor 10, at each cycle of the carrier signal output from the transmitter 20. Accordingly, the I/O port 12 includes a PWM circuit (not shown) which generates the PWM signal based on the command value.

Figure 10:
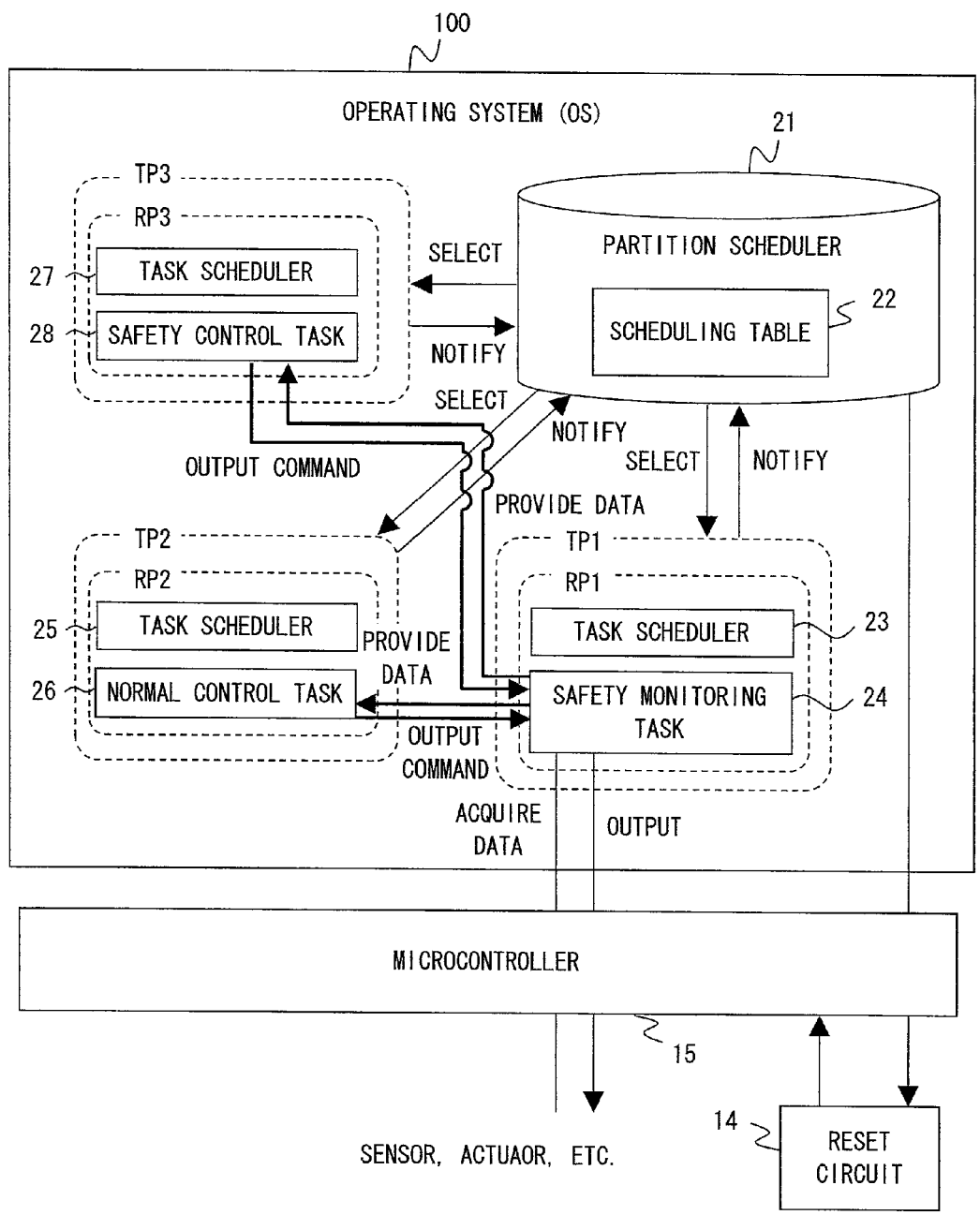
FIG. 10 is a diagram showing relationships between a partition scheduler and tasks which are activated in an execution environment provided by an OS shown in FIG. 9.

Subsequently, relationships between the partition scheduler 21 and tasks generated upon activation of the applications 101 to 103 will be described with reference to FIG. 10. FIG. 10 is a diagram showing the relationships between the partition scheduler 21 and the tasks 24, 26, and 28 which are activated in a multiprogramming environment provided by the OS 100. Hereinafter, description of the same contents as those of the second embodiment of the present invention is omitted. Note that in FIG. 10, arrows indicating tasks to be monitored by the safety monitoring task 24 shown in FIG. 4 are omitted.

In the second embodiment, as shown in FIG. 10, only the safety monitoring task 24 belonging to TP1 is configured to be accessible to an external device such as a sensor or a motor.

The safety monitoring task 24 outputs a command value to the I/O port 12, thereby controlling the motor. The safety monitoring task 24 acquires data measured by the sensor (hereinafter, also referred to as "sensor value") from the sensor through the I/O port 12. The safety monitoring task 24 provides the acquired sensor value to the normal control task 26 and the safety control task 28. For example, the safety monitoring task 24 transfers the acquired sensor value to each of the normal control task 26 and the safety control task 28 by means of an inter-task communication. Note that at this time, the sensor value may be transferred through the execution memory 11.

Each of the normal control task 26 and the safety control task 28 performs calculation for controlling the motor, based on the sensor value transferred from the safety monitoring task 24. Each of the normal control task 26 and the safety control task 28 instructs the safety monitoring task 24 to output a command value generated by the control calculation. For example, each of the normal control task 26 and the safety control task 28 transfers the command value to the monitor task 24 by means of an inter-task communication. Note that at this time, the command value may be transferred through the execution memory 11. Upon receiving the command value from one of the normal control task 26 and the safety control task 28, the safety monitoring task 24 outputs the command value to the I/O port 12.

Figure 11:
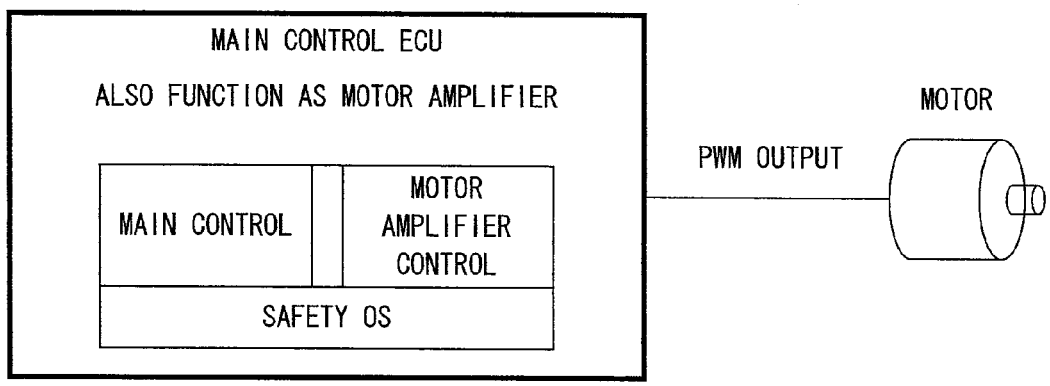
FIG. 11 is a diagram showing a main control ECU according to the second embodiment of the invention.

In the second embodiment, as shown in FIG. 11, a case is described in which the microcontroller 15 is applied to a main control ECU. The normal control task 26 performs a main control shown in FIG. 11, and the safety monitoring task 24 performs a motor amplifier control.

Figure 12:
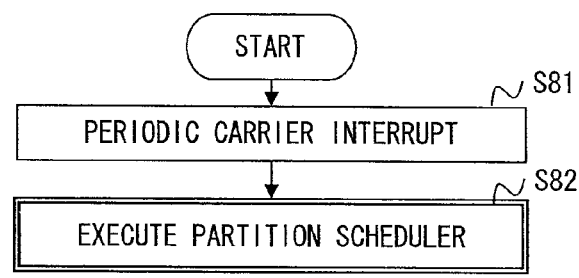
FIG. 12 is a flowchart showing a specific example of a procedure of a partition scheduler according to the second embodiment of the invention.
Figure 13:
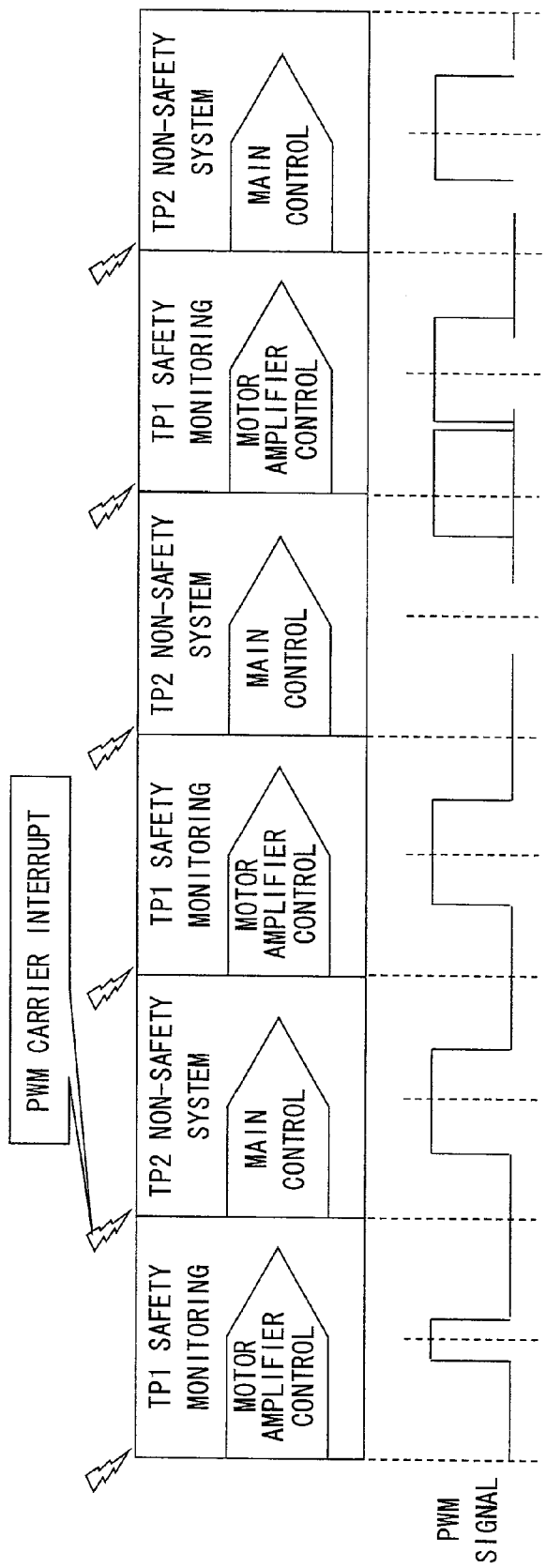
FIG. 13 is a diagram showing a scheduling pattern and a PWM signal in the period of each TP according to the second embodiment of the invention.

Referring next to FIGS. 12 and 13, operation of the safety controller 2 according to the second embodiment will be described. FIG. 12 is a flowchart showing a specific example of a procedure of the partition scheduler 21 according to the second embodiment. FIG. 13 is a diagram showing a scheduling pattern according to the second embodiment, and a PWM signal in each period of TPs. That is, in the second embodiment, the scheduling table 22 holds the scheduling pattern illustrated in FIG. 13.

Every time a periodic carrier interrupt to the processor 10 is generated (S81), the processor 10 executes the partition scheduler 21 (S82).

Accordingly, TPs are switched as illustrated in FIG. 13 every time a carrier interrupt is generated. The normal control task 26 belonging to TP2 generates a command value and performs the main control for instructing the safety monitoring task 24 to output the generated command value. Further, the safety monitoring task 24 belonging to TP1 performs the motor amplifier control for outputting the command value received from the normal control task 26 to the I/O port 12. Accordingly, as shown in FIG. 13, the control content indicated by the command value is reflected in the PWM signal at a cycle of a subsequent carrier signal subjected to the motor amplifier control. That is, it is possible to control the control target in synchronization with the carrier signal.

Figure 14:
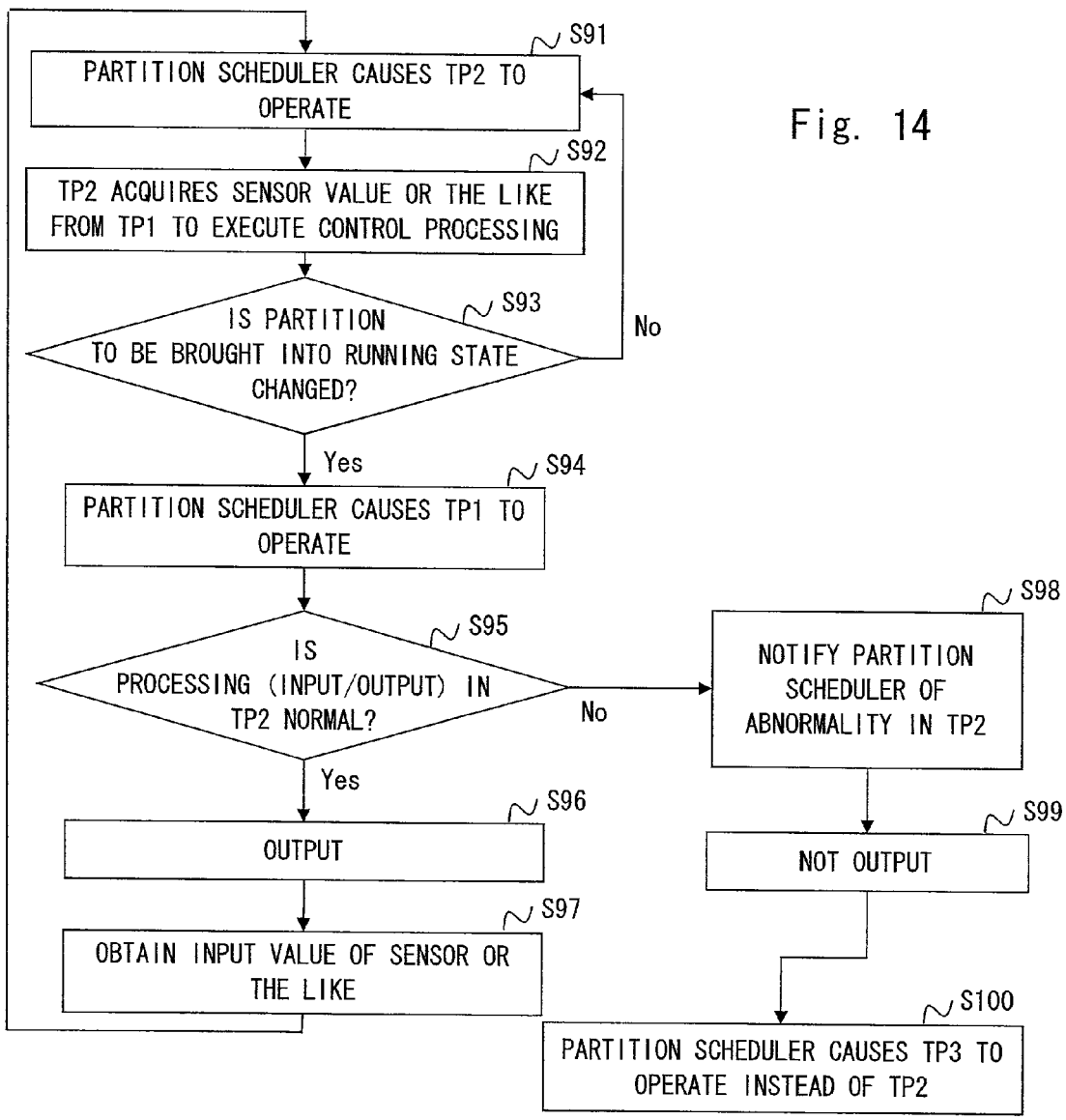
FIG. 14 is a flowchart showing a specific example of a partition scheduling procedure according to the second embodiment of the invention.

Referring next to FIG. 14, partition scheduling processing according to the second embodiment will be described. FIG. 14 is a flowchart showing a specific example of the partition scheduling procedure according to the second embodiment.

Here, in the operation illustrated in FIG. 13, processing after the activation of TP2 will be described. The partition scheduler 21 activates TP2 and causes the task scheduler 25 to operate (S91). The task scheduler 25 executes the normal control task 26. The normal control task 26 acquires a sensor value from the safety monitoring task 24 belonging to TP1 and performs control processing (S92). That is, the normal control task 26 transfers the command value generated by the control calculation to the safety monitoring task 24. The execution of the normal control task 26 is continued until no time resource remains in TP2 (No in S93, S91, S92).

When no time resource remains in TP2 (Yes in S93), the partition scheduler 21 activates TP1 and causes the task scheduler 23 to operate (S94). The task scheduler 23 executes the safety monitoring task 24. The safety monitoring task 24 determines whether the command value transferred from the normal control task 26 is normal (S95).

When the command value is normal (Yes in S95), the safety monitoring task 24 outputs the command value to the I/O port 12 (S96). Further, the safety monitoring task 24 acquires the sensor value from the sensor (S97). Here, the acquired sensor value is transferred to the normal control task 26. After that, the processing from step S91 is executed again.

When the command value is not normal (No in S95), the safety monitoring task 24 notifies the partition scheduler 21 that the normal control task 26 belonging to TP2 is abnormal (S98). In this case, the notification is carried out by means of an inter-task communication, for example. Then, the safety monitoring task 24 inhibits the output of the command value to the I/O port 12 (S99). The partition scheduler 21 switches the time partition from TP 2 to TP3 in response to the notification of the abnormality from the safety monitoring task 24 (S100). Thus, the safety control task 28 performs control for ensuring functional safety.

As described above, in the second embodiment, the interrupt signal generation circuit 17 generates an interrupt signal to the processor 10 at each cycle of the carrier signal, and outputs the generated interrupt signal to the processor 10. The processor 10 switches the time partition in response to the output of the interrupt signal from the interrupt signal generation circuit 17. Then, when the time partition is switched to TP1, the safety monitoring task 24 outputs the command value to the I/O port 12.

Accordingly, even when the I/O port 12 updates the control content for the control target with the control content indicated by the command value at each cycle of the carrier signal, delay of the instruction of the control content with respect to the control cycle can be reduced. That is, it is possible to control the control target in synchronization with the control cycle.

Figure 21:
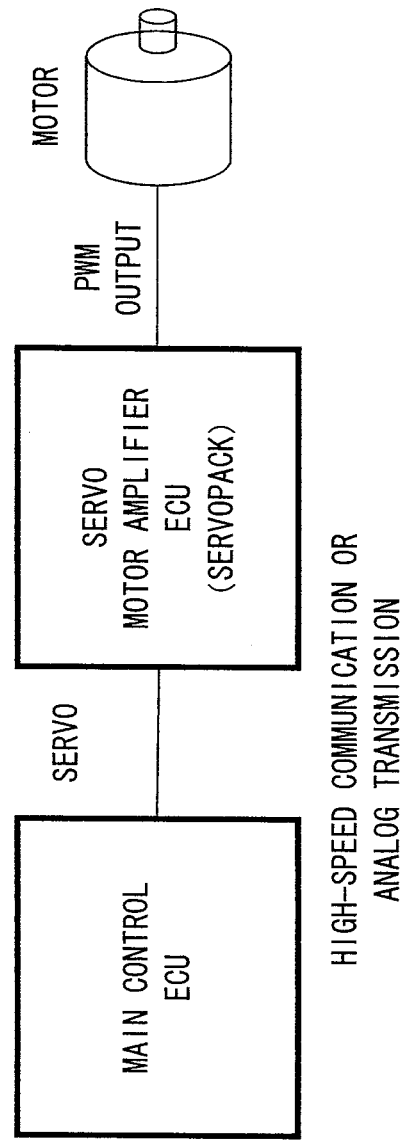
FIG. 21 is a diagram for explaining a problem.

Further, the safety monitoring task 24 for executing processing related to ensuring of functional safety of the control target is made independent from the normal control task 26 for executing other processing related to control of the control target, by time partitioning. For this reason, as in the second embodiment, the safety can be maintained even when a main control and a servo amplifier control are implemented on the same ECU. Furthermore, as shown in FIG. 21, since the main control and the servo amplifier control can be implemented on the same ECU, there is no need to separately provide the main control ECU and the motor amplifier ECU, which contributes to a reduction in size and cost.

Moreover, in the second embodiment, the safety monitoring task 24 outputs the command value generated by the normal control task 26. Accordingly, in the safety monitoring task 24, the output can be inhibited when the command value is abnormal, thereby preventing a malfunction of the control target.

[Third Embodiment of the Invention]

Figure 15:
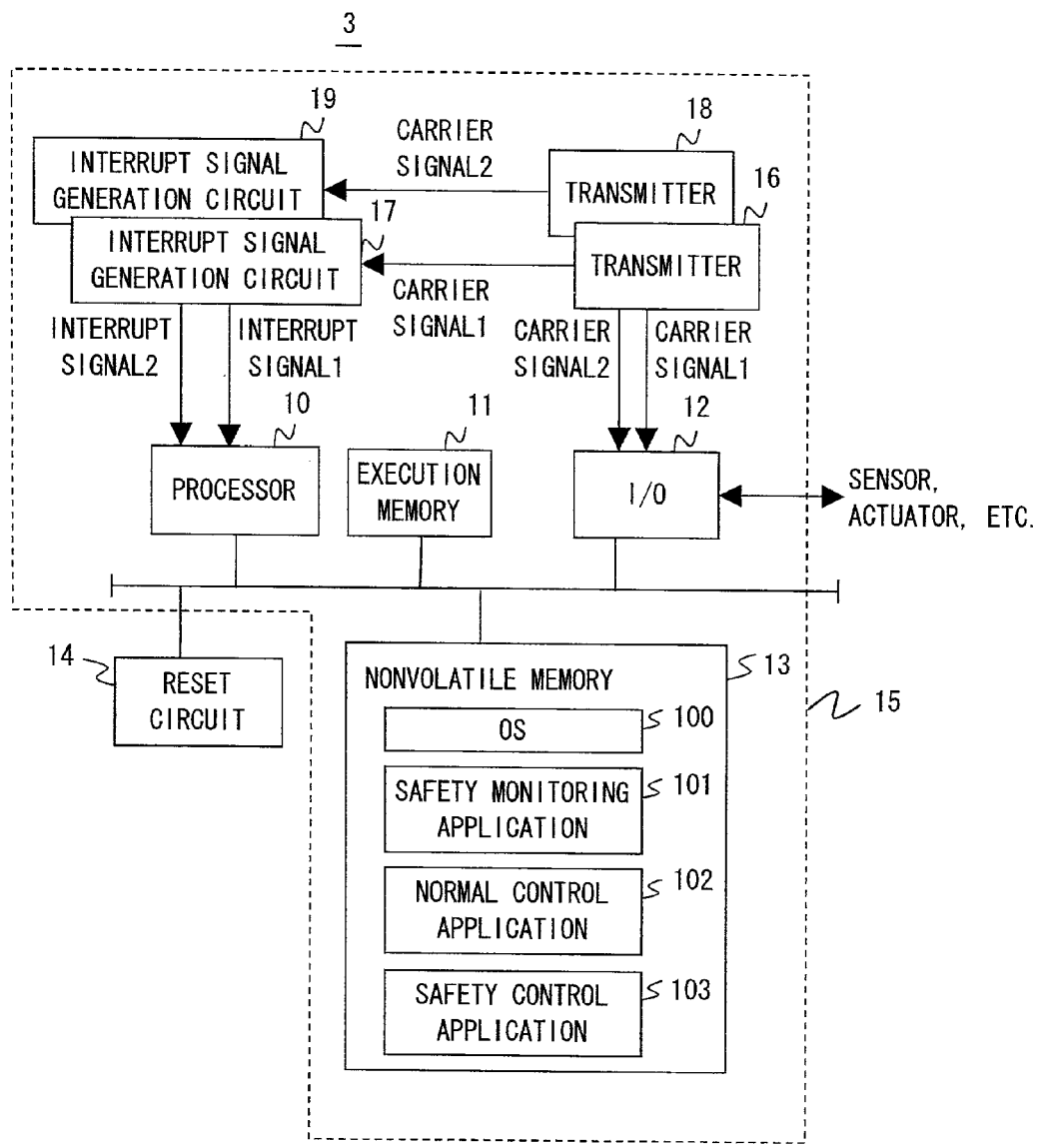
FIG. 15 is a block diagram showing an exemplary configuration of a safety controller according to a third embodiment of the invention.

Referring next to FIG. 15, a configuration of a safety controller 2 according to a third embodiment of the invention will be described. FIG. 15 is a block diagram showing an exemplary configuration of the safety controller 2 according to the third embodiment. Hereinafter, description of the same contents as those of the safety controller 2 according to the third embodiment is omitted.

The safety controller 2 according to the third embodiment includes a plurality of transmitters 16 and 18 and a plurality of interrupt signal generation circuits 17 and 19. The transmitters 16 and 18 generate carrier signals having different phases.

The transmitter 18 generates a carrier signal and outputs the generated carrier signal to each of the I/O port 12 and the interrupt signal generation circuit 19. The interrupt signal generation circuit 19 generates an interrupt signal based on the carrier signal output from the transmitter 16 and outputs the generated interrupted signal to the processor 10 in the same manner as the interrupt signal generation circuit 17.

Accordingly, the I/O port 12 controls a motor based on two carrier signals. In the third embodiment, the I/O port 12 controls each two-axis motor by the carrier signals. That is, the I/O port 12 generates two PWM signals and outputs the PWM signals to the axes, respectively. Thus, in the third embodiment, a command value for each axis is output from the processor 10 to the I/O port 12.

When the interrupt signal generation circuit 17 and the interrupt signal generation circuit 19 respectively output interrupt signals, the processor 10 causes the partition scheduler 21 to operate.

The relationships between the partition scheduler 21 and tasks generated upon activation of the applications 101 to 103 are similar to those of the second embodiment, so the description thereof is omitted.

Figure 16:
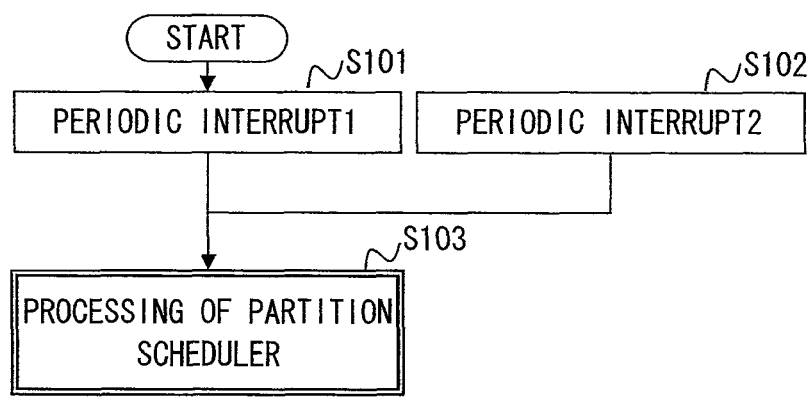
FIG. 16 is a flowchart showing a specific example of a procedure of a partition scheduler according to the third embodiment of the invention.
Figure 17:
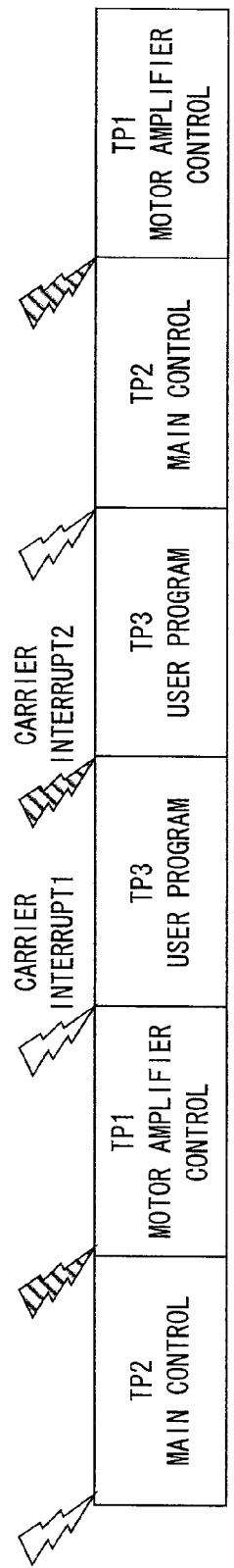
FIG. 17 is a diagram showing a specific example of a scheduling pattern according to the third embodiment of the invention.

Referring next to FIGS. 16 and 17, operation of the safety controller 3 according to the third embodiment will be described. FIG. 16 is a flowchart showing a specific example of a procedure of the partition scheduler 21 according to the third embodiment. FIG. 17 is a diagram showing a scheduling pattern according to the third embodiment. That is, in the third embodiment, the scheduling table 22 holds the scheduling pattern illustrated in FIG. 17.

Every time a periodic carrier interrupt to the processor 10 is generated by each of the interrupt signal generation circuit 17 and the interrupt signal generation circuit 19 (S101, S102), the processor 10 executes the partition scheduler 21 (S103).

Figure 18:
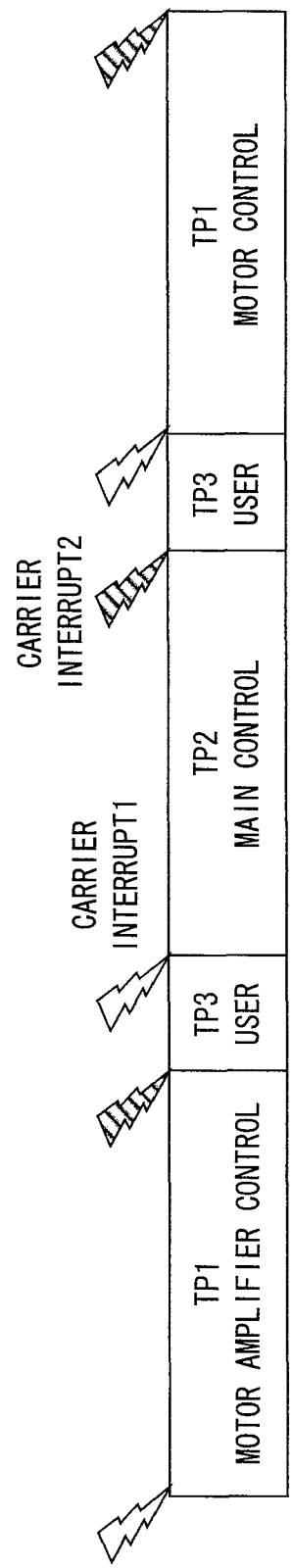
FIG. 18 is a diagram showing a specific example of another scheduling pattern according to the third embodiment of the invention.

Accordingly, every time a carrier interrupt is generated, TPs are switched as illustrated in FIG. 17. Thus, interrupts are generated based on a plurality of carrier signals with shifted phases, thereby enabling switching of TPs at a faster cycle. Further, the length of the period of each TP can be varied as illustrated in FIG. 18, by adjusting the phase difference between the carrier signals respectively generated in the transmitter 16 and the transmitter 18. Note that "user program" and "user" in FIGS. 17 and 18 indicate arbitrary processing implemented by a user of the safety controller 3.

As described above, according to the third embodiment, interrupts are generated at timings of partition scheduling based on the plurality of carrier signals whose phases are shifted from each other. Accordingly, a finer resolution of TPs can be obtained as compared with the second embodiment. This leads to a further reduction in delay of the instruction of the control content with respect to the control cycle.

Furthermore, according to the third embodiment, by adjusting the phase difference between the carrier signals, a plurality of interrupt signals can be generated so that a period between the output of a first interrupt signal and the output of a second interrupt signal subsequent to the first interrupt signal is different from a period between the output of the second interrupt signal and the output of a third interrupt signal subsequent to the second interrupt signal. Accordingly, the weight of each TP can be more finely set as illustrated in FIG. 18.

[Fourth Embodiment of the Invention]

Subsequently, the safety controller 1 according to a fourth embodiment of the invention will be described. Note that the configuration of the safety controller 1 according to the fourth embodiment is similar to that of the safety controller 1 according to the first embodiment, so the description thereof is omitted.

Figure 19:
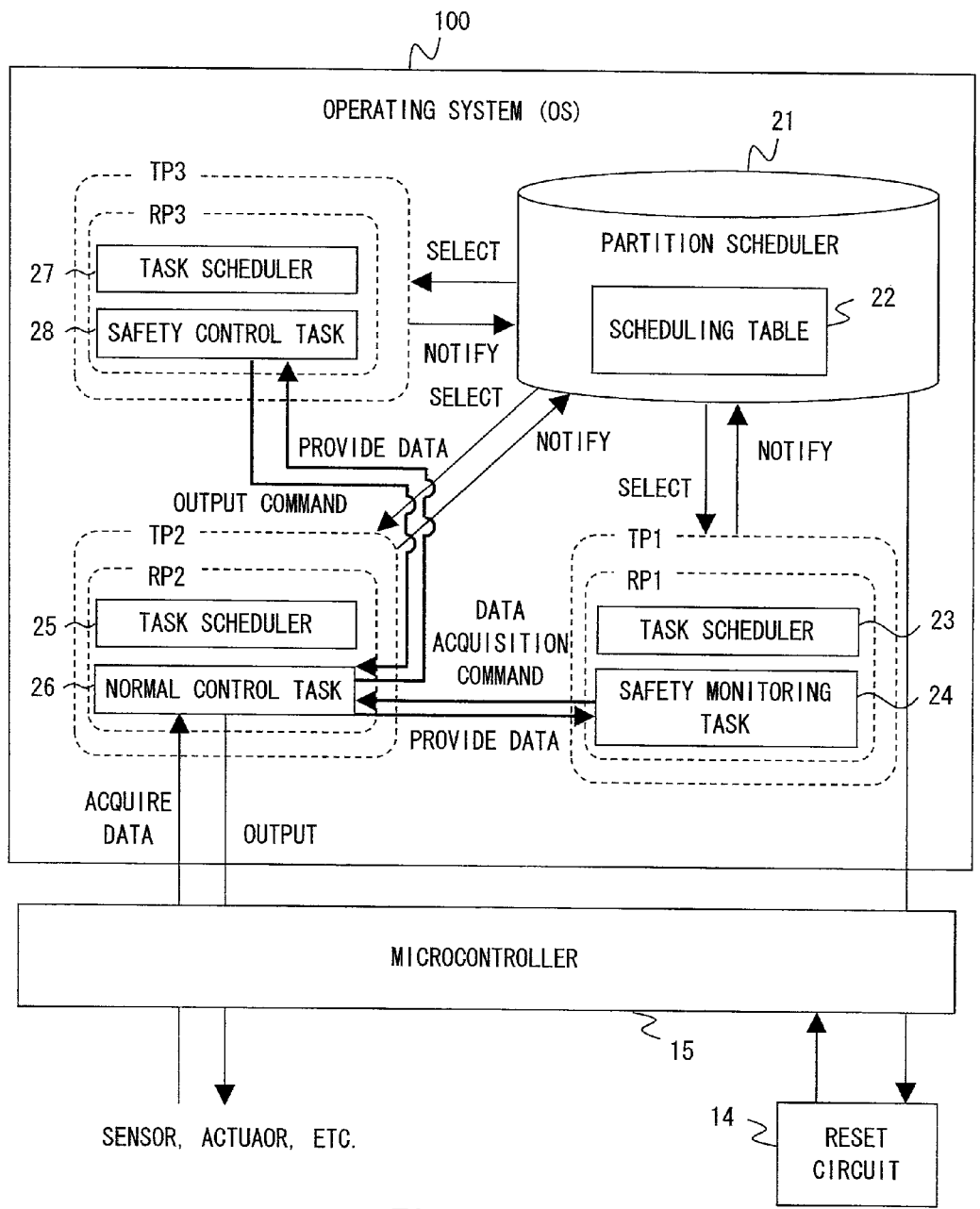
FIG. 19 is a diagram showing relationships between a partition scheduler and tasks which are activated in an environment provided by an OS according to the third embodiment of the invention.

Subsequently, relationships between the partition scheduler 21 and tasks generated upon activation of the applications 101 to 103 will be described with reference to FIG. 19. FIG. 19 is a diagram showing the relationships between the partition scheduler 21 and the tasks 24, 26, and 28 which are activated in a multiprogramming environment provided by the OS 100. Hereinafter, description of the same contents as those of the first embodiment of the present invention is omitted. Note that in FIG. 19, arrows indicating tasks to be monitored by the safety monitoring task 24 shown in FIG. 4 are omitted.

In the fourth embodiment, as shown in FIG. 19, only the normal control task 26 belonging to TP2 is configured to be accessible to an external device such as a sensor or a motor.

The normal control task 26 acquires a sensor value from the sensor through the I/O port 12. The normal control task 26 performs calculation for controlling the motor, based on the acquired sensor value. The normal control task 26 controls the motor by outputting a command value, which is generated by the control calculation, to the I/O port 12. The normal control task 26 provides the acquired sensor value to each of the safety monitoring task 24 and the safety control task 28. For example, the normal control task 26 transfers the acquired sensor value to each of the safety monitoring task 24 and the safety control task 28 by means of an inter-task communication. Note that at this time, the sensor value may be transferred through the execution memory 11.

The safety monitoring task 24 monitors an abnormality of a control target based on the sensor value transferred from the normal control task 26. The safety monitoring task 24 may instruct the normal control task 26 to acquire the sensor value. For example, the safety monitoring task 24 instructs the normal control task 26 to acquire the sensor value by means of an inter-task communication.

Each safety control task 28 performs calculation for controlling the motor, based on the sensor value transferred from the normal control task 26. The safety control task 28 instructs the normal control task 26 to output the command value generated by the control calculation. For example, the safety control task 28 transfers the command value to the normal control task 26 by means of an inter-task communication. Note that at this time, the command value may be transferred via the execution memory 11. Upon receiving the command value from the safety control task 28, the normal control task 26 outputs the command value to the I/O port 12.

Figure 20:
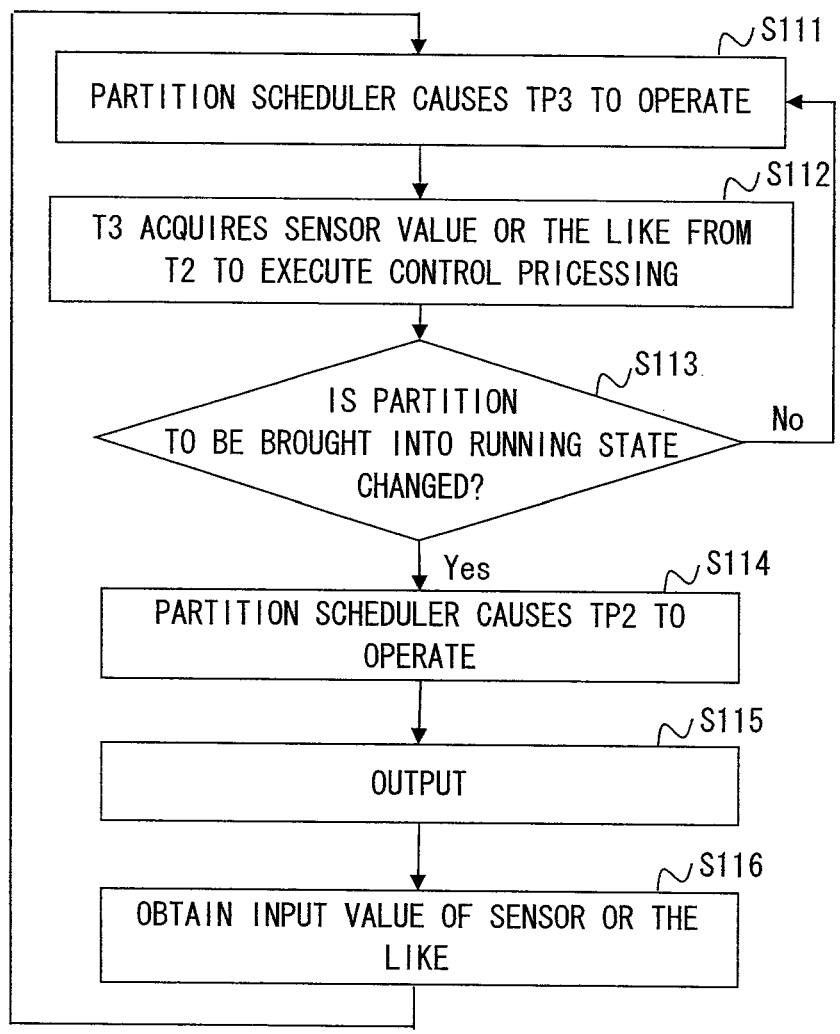
FIG. 20 is a flowchart showing a specific example of a partition scheduling procedure according to a fourth embodiment of the invention.

Referring next to FIG. 20, partition scheduling processing according to the fourth embodiment will be described. FIG. 20 is a flowchart showing a specific example of the partition scheduling procedure according to the fourth embodiment. Assume herein that the scheduling pattern according to the fourth embodiment is defined so that TP3 and TP2 are repeated.

Here, processing after activation of TP3 is described. The partition scheduler 21 activates TP3 and causes the task scheduler 27 to operate (S111). The task scheduler 27 executes the safety control task 28. The safety control task 28 acquires the sensor value from the normal control task 26 belonging to TP2 and performs control processing (S112). That is, the safety control task 28 transfers the command value generated by the control calculation to the normal control task 26, and the execution of the safety control task 28 is continued until no time resource remains in TP3 (No in S113, S111, S112).

When no time resource remains in TP3 (Yes in S113), the partition scheduler 21 activates TP2 and causes the task scheduler 25 to operate (S114). The task scheduler 25 executes the normal control task 26. The normal control task 26 outputs the command value transferred from the safety control task 28 to the I/O port 12 (S115). Further, the normal control task 26 acquires the sensor value from the sensor (S116). Here, the acquired sensor value is transferred to the safety monitoring task 24 and the safety control task 28.

Here, access to the IO of the sensor, the motor, or the like is often made via communication with the processor 10, and an interrupt to the processor 10 is generated in many cases. For this reason, if access to the IO is made in the safety-related system, there is a fear that processing related to ensuring of functional safety cannot be executed. Meanwhile, as described above, in the fourth embodiment, the normal control task 26 outputs the command value generated by the safety control task 28. Thus, according to the fourth embodiment, the control target can be controlled without affecting the safety-related system.

Further, according to the fourth embodiment, processing for accessing the IO is implemented only in the normal control task 26 which is not a safety-related system. Therefore, the safety-related system can be constructed in a small size, which contributes to a reduction in cost of the safety-related system.

Moreover, the present invention is not limited to the above embodiments, and various modifications can be made without departing from the scope of the present invention as described above. For example, the present invention can also be carried out by combining any of the first to fourth embodiments.

The embodiments of the present invention have exemplified the case where the OS includes TP1 to TP3, but the types and the number of TPs are not limited thereto. The scheduling patterns are also not limited to those exemplified in the embodiments of the present invention. Furthermore, the types and the number of tasks belonging to TPs are not limited to those exemplified in the embodiments of the present invention.

The second embodiment has exemplified the case where the interrupt signal is generated every one cycle of the carrier signal, but the present invention is not limited thereto. For example, also when the interrupt signal is generated every two cycles of the carrier signal, delay of the instruction of the control content with respect to the control cycle can be drastically reduced as compared with the case of the operation based on the clock signal. In other words, the interrupt signal may also be generated every predetermined cycles other than one cycle.

Furthermore, in the second embodiment, the I/O port 12 updates the control content for the control target with the control content indicated by the command value output from the processor 10, every one cycle of the carrier signal, but the present invention is not limited thereto. For example, the control content may be updated every predetermined cycles other than one cycle.

The third embodiment has exemplified the case where two transmitters and two interrupt signal generation circuits are provided, but the present invention is not limited thereto. The safety controller may be provided with three or more transmitters and three or more interrupt signal generation circuits.

REFERENCE SIGNS LIST

1, 2, 3 SAFETY CONTROLLER
10 PROCESSOR
11 EXECUTION MEMORY
12 I/O PORT
13 NON-VOLATILE MEMORY
14 RESET CIRCUIT
15 MICROCONTROLLER
16, 18 TRANSMITTER
17, 19 INTERRUPT SIGNAL GENERATION CIRCUIT
21 PARTITION SCHEDULER
22 SCHEDULING TABLE
23, 25, 27, 29 TASK SCHEDULER
24 SAFETY MONITORING TASK
26 NORMAL CONTROL TASK
28 SAFETY CONTROL TASK
30 INTERRUPT PROCESSING TASK
100 OPERATING SYSTEM
101 SAFETY MONITORING APPLICATION
102 NORMAL CONTROL APPLICATION
103 SAFETY CONTROL APPLICATION

The invention claimed is:
1. A safety controller comprising:
a processor that outputs instruction information for instructing a control content for a control target;

a system program for controlling allocation of an execution time of the processor to a safety-related task for executing processing related to ensuring of functional safety of the control target, and to a normal control task for executing other processing related to control of the control target;

a signal generation unit that generates a carrier signal;

a control unit that updates the control content for the control target with a control content instructed by the instruction information output from the processor, every first predetermined cycle of the carrier signal generated by the signal generation unit, and performs PWM (Pulse Width Modulation) control for the control target based on the control content updated; and an interrupt signal generation unit that generates an interrupt signal to the processor and outputs the interrupt signal to the processor every second predetermined cycle of the carrier signal generated by the signal generation unit, wherein the processor executes the system program to schedule the tasks in accordance with scheduling information indicating scheduling contents of a safety-related time partition in which the execution time is allocated to the safety-related task, and of a normal control time partition in which the execution time is allocated to the normal control task, the processor executes the system program to switch the time partitions according to an output of the interrupt signal from the interrupt signal generation unit, and the processor outputs the instruction information to the control unit by executing one of the normal control task and the safety-related task.

2. The safety controller according to claim 1, wherein the signal generation unit generates a plurality of carrier signals with different phases.

3. The safety controller according to claim 2, wherein the signal generation unit generates the plurality of carrier signals with different phases so that a period between an output of a first interrupt signal and an output of a second interrupt signal subsequent to the first interrupt signal is different from a period between the output of the second interrupt signal and an output of a third interrupt signal subsequent to the second interrupt signal, among a plurality of interrupt signals generated by the interrupt signal generation unit based on the plurality of carrier signals.

4. The safety controller according to claim 1, wherein the processor executes the normal control task to generate the instruction information, and the processor executes the safety-related task to output the instruction information generated by the normal control task to the control unit, and to inhibit output of the instruction information when the instruction information is abnormal.

5. The safety controller according to claim 1, wherein the processor executes the safety-related task to generate the instruction information, and the processor executes the normal control task to output the instruction information generated by the safety-related task to the control unit.

6. A safety control method for updating a control content for a control target with a control content instructed by generated instruction information every first predetermined cycle of a carrier signal, and for performing PWM control for the control target with the control content updated, the safety control method comprising the steps of:

generating an interrupt to a processor every second predetermined cycle of the carrier signal;

switching, upon generation of the interrupt, a time partition to one of a safety-related time partition in which an execution time of the processor is allocated to a safety-related task for executing processing related to ensuring of functional safety of the control target, and a normal control time partition in which the execution time is allocated to a normal control task for executing other processing related to control of the control target, in accordance with scheduling information indicating scheduling contents of the safety-related time partition and of the normal control time partition;

scheduling the tasks in accordance with the scheduling information, and allocating the execution time to one of the safety-related task and the normal control task in one of the safety-related time partition and the normal control time partition after the switching; and generating the instruction information by executing one of the normal control task and the safety-related task to which the execution time is allocated.

* * * * *